US 11,820,495 B2

(12) United States Patent
Kerr et al.

(10) Patent No.: US 11,820,495 B2
(45) Date of Patent: Nov. 21, 2023

(54) ACTUATOR FOR AN AIRCRAFT LANDING GEAR ASSEMBLY

(71) Applicant: AIRBUS OPERATIONS LIMITED, Bristol (GB)

(72) Inventors: Sean Kerr, Bristol (GB); David Marles, Bristol (GB); Paul Gordon L'Allier, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 182 days.

(21) Appl. No.: 17/319,722

(22) Filed: May 13, 2021

(65) Prior Publication Data

US 2021/0291966 A1 Sep. 23, 2021

Related U.S. Application Data

(63) Continuation of application No. 17/206,977, filed on Mar. 19, 2021, now abandoned.

(30) Foreign Application Priority Data

Mar. 20, 2020 (GB) ..................... 2004086

(51) Int. Cl.
*B64C 25/22* (2006.01)
*B64C 25/30* (2006.01)
*F15B 15/22* (2006.01)

(52) U.S. Cl.
CPC .............. *B64C 25/22* (2013.01); *B64C 25/30* (2013.01); *F15B 15/224* (2013.01)

(58) Field of Classification Search
CPC ....... B64C 25/22; B64C 25/30; F15B 15/204; F15B 15/224
See application file for complete search history.

(56) References Cited

U.S. PATENT DOCUMENTS 4,337,912 A 7/1982 Watton
4,393,751 A * 7/1983 Kelley ................ F15B 15/224
137/513.3

(Continued)

FOREIGN PATENT DOCUMENTS

CN 107355450 11/2017
EP 1 435 461 7/2004

(Continued)

OTHER PUBLICATIONS

Extended European Search Report for European Application No. 21163653.5, 17 pages, dated Aug. 18, 2021.

*Primary Examiner* — Richard G Davis
(74) *Attorney, Agent, or Firm* — Nixon & Vanderhye P.C.

(57) ABSTRACT

A single acting actuator for an aircraft landing gear assembly is disclosed having a piston mounted in a cavity and moveable relative to a housing between a retracted position and an extended position, the piston dividing the cavity into first and second pressure chambers. At least one of the pressure chambers is associated with first and second outlets, with the actuator being arranged such that, in respect of the relative movement in which the pressure chamber is the decreasing volume pressure chamber, in a first stage of the relative movement the first and second outlets are open thereby allowing actuator fluid to flow out of the pressure chamber through the first and second outlets and in a second stage of the relative movement the second outlet is open but the first outlet is closed, thereby acting to slow the relative movement of the piston with respect to the housing.

26 Claims, 15 Drawing Sheets

(56) References Cited

U.S. PATENT DOCUMENTS

| | | | |
|---|---|---|---|
| 6,186,043 B1* | 2/2001 | Callies | F15B 15/224 |
| | | | 91/422 |
| 2009/0050736 A1* | 2/2009 | Bennett | B64C 25/58 |
| | | | 244/102 R |
| 2016/0348701 A1 | 12/2016 | Marles | |
| 2019/0202550 A1 | 7/2019 | Evans et al. | |
| 2019/0241256 A1* | 8/2019 | Moine | B64C 25/22 |

FOREIGN PATENT DOCUMENTS

| | | |
|---|---|---|
| EP | 2 322 808 | 5/2011 |
| EP | 2 792 890 | 10/2014 |
| EP | 2 982 603 | 2/2016 |
| EP | 3 246 593 | 11/2017 |
| FR | 2 303 976 | 10/1976 |
| GB | 2 470 499 | 11/2010 |
| WO | 2006/089582 | 8/2006 |

\* cited by examiner

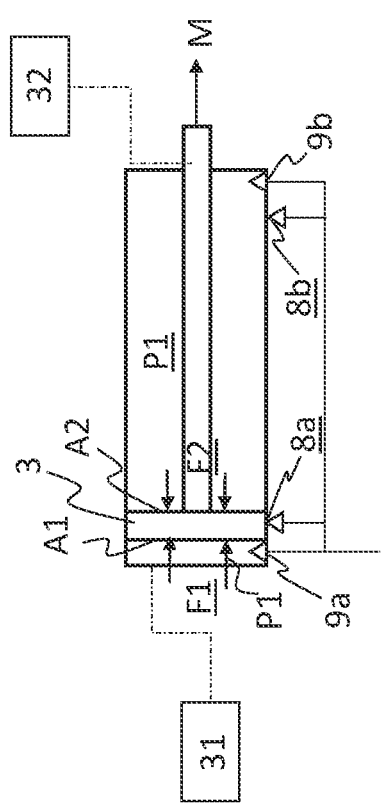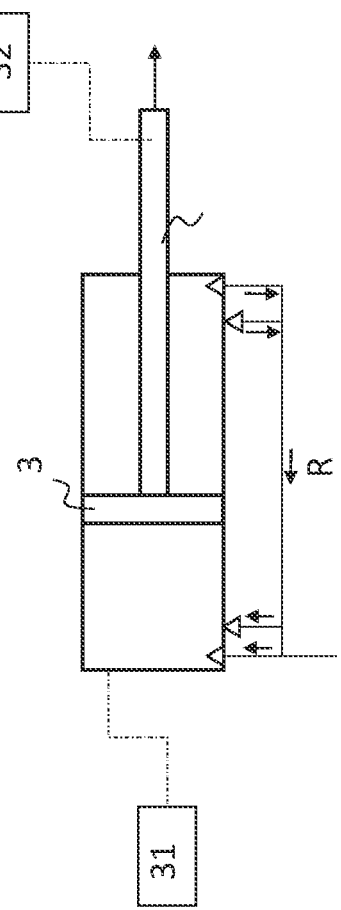

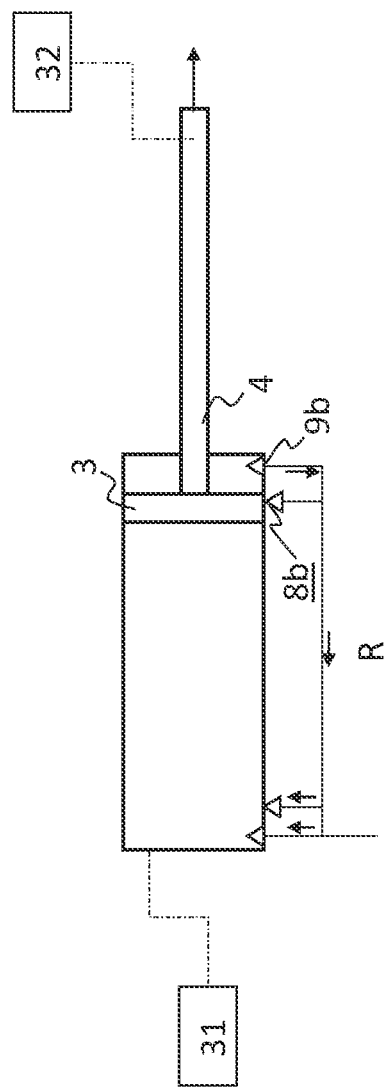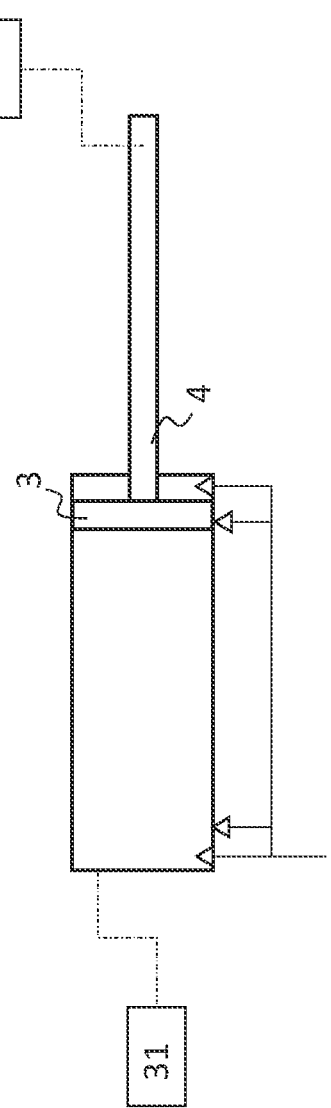

ACTUATOR FOR AN AIRCRAFT LANDING GEAR ASSEMBLY

CROSS REFERENCE TO RELATED APPLICATIONS

This application is a Continuation of U.S. patent application Ser. No. 17/206,977, filed Mar. 19, 2021, now pending, which claims priority to United Kingdom Patent Application GB 2004086.1, filed Mar. 20, 2020, the entire contents of each of which is hereby incorporated by reference.

BACKGROUND OF THE INVENTION

The present invention relates to a single acting actuator for an aircraft landing gear assembly. The present invention also relates to an actuation system for an aircraft landing gear assembly, an aircraft landing gear system and a method of actuation of an aircraft landing gear assembly.

Actuators for aircraft landing gear assemblies, for example to actuate landing gear bay doors and/or landing gear are typically dual acting actuators. In this respect actuator fluid (e.g. hydraulic fluid) in a first pressure chamber is pressurised so as to move a piston of the actuator, relative to a body of the actuator, from a retracted position to an extended position and actuator fluid in a second pressure chamber is pressurised so as to move the piston, relative to the body of the actuator, in the opposite direction from the extended position to the retracted position. However dual acting actuators are relatively complex and so are relatively expensive, heavy and prone to malfunction.

Furthermore, due to the typically high loads involved with extension and/or retraction of an aircraft landing gear assembly (e.g. due to high weight of the moving parts and/or aerodynamic loads), there is a requirement for an actuator for an aircraft landing gear assembly to have a means of slowing the actuator towards the end of its travel, to reduce impact loads on the actuator and/or landing gear assembly.

The present invention seeks to address or mitigate at least some of the above mentioned problems. Alternatively, or additionally, the present invention seeks to provide an improved single acting actuator for an aircraft landing gear assembly. Alternatively, or additionally, the present invention seeks to provide an improved an actuation system for an aircraft landing gear assembly. Alternatively, or additionally, the present invention seeks to provide an improved aircraft landing gear system. Alternatively, or additionally, the present invention seeks to provide an improved method of actuation of an aircraft landing gear assembly.

SUMMARY OF THE INVENTION

According to a first aspect of the invention there is provided a single acting actuator for an aircraft landing gear assembly, the actuator comprising:
a housing;
a cavity provided in the housing;
a piston and a piston rod connected to the piston;
the piston being mounted in the cavity for relative movement with respect to the housing such that the piston and piston rod are movable relative to the housing between a retracted position and an extended position;
the piston dividing the cavity into first and second pressure chambers such that the volume of one of the pressure chambers is increased and the volume of the other is decreased as the piston is moved relative to the housing;
the piston being movable relative to the housing from one of the retracted and extended positions to the other by a resultant force on the piston due to the pressure of actuator fluid in the first and second pressure chambers;
wherein at least one of the pressure chambers is associated with first and second outlets, with the actuator being arranged such that, in respect of the relative movement in which the pressure chamber is the decreasing volume pressure chamber, in a first stage of the relative movement the first and second outlets are open thereby allowing actuator fluid to flow out of the pressure chamber through the first and second outlets and in a second stage of the relative movement the second outlet is open but the first outlet is closed, thereby acting to slow the relative movement of the piston with respect to the housing.

The present invention recognises that an actuator for an aircraft landing gear assembly may only be required to generate an actuating force in a single direction. For example an actuating force may only be required to retract a landing gear assembly (for example landing gear or landing gear bay doors), with the deployment primarily achieved by the weight the landing gear assembly and/or aerodynamic force on the landing gear assembly.

The arrangement of the first and second outlets, to slow the movement of the piston relative to the housing in the second stage of the relative movement may slow the relative movement of the piston and housing towards the end of travel of the actuator, to the retracted and/or extended positions, which may thereby reduce impact loads on the actuator and/or landing gear assembly. In this respect, the first and second outlets provide a snubbing effect. This is particularly important, when used to actuate a landing gear assembly, due to the typically high loads involved (e.g. due to relatively high weight of the landing gear assembly and/or the relatively high aerodynamic forces on the landing gear assembly).

The provision of the first and second outlets may provide a particularly effective means of snubbing a single acting actuator. In this respect, the provision of first and second outlets may allow for a relatively high flow rate of actuator fluid out of the decreasing volume pressure chamber during the first stage of relative movement whilst also allowing for a relatively large reduction in the outlet flow rate during the second stage. In this respect, the second outlet may be configured such that the flow through the second outlet, out of the decreasing volume pressure chamber, is restricted relative to the first outlet (see below). Also the first and second outlets may be positioned relative to each other so as to provided for a desired snubbing behaviour throughout the movement of the piston relative to the housing, based on the requirements of the actuation.

In embodiments of the invention the piston is movable relative to the housing from the other of the retracted and extended positions to the one of the retracted and extended positions under the action of a force on a landing gear assembly, when the actuator is arranged with a landing gear assembly so as to actuate the landing gear assembly.

It will be appreciated that the first and second outlets are distinct outlets, i.e. they are not the same outlet. The first and second outlets may be spaced apart from each other.

It will be appreciated that when the piston and piston rod are in the extended position the piston rod extends further out of the housing than when the piston and piston rod are in the retracted position.

Optionally when the piston is moved relative to the housing from the extended position to the retracted position, the first pressure chamber is the decreasing volume pressure chamber and the second pressure chamber is the increasing volume pressure chamber and when the piston is moved relative to the housing from the retracted position to the extended position, the second pressure chamber is the decreasing volume pressure chamber and the first pressure chamber is the increasing volume pressure chamber.

In embodiments of the invention the first pressure chamber has at least one inlet for actuator fluid. In embodiments of the invention the second pressure chamber has at least one inlet for actuator fluid. The at least one inlet may be formed by the first and/or second outlets associated with the pressure chamber.

The first pressure chamber may be provided between a first side of the piston and an opposed side of the housing and the second pressure chamber may be provided between a second side of the piston and an opposed side of the housing. The first side of the piston may be on an opposite side of the piston to the piston rod. In this respect the second side of the piston may be on the same side of the piston as the piston rod. The second side of the piston may be on the side of the piston facing the direction of extension of the piston rod from the housing (when in the extended position).

It will be appreciated that the second stage of relative movement occurs after the first stage. In embodiments of the invention the second stage of relative movement occurs towards the end of the movement of the piston relative to the housing to the retracted or extended position. In this respect, where the first pressure chamber is associated with the first and second outlets and the first pressure chamber is the decreasing volume pressure chamber, the second stage may occur towards the end of the relative movement to the retracted position. Where the second pressure chamber is associated with the first and second outlets and the second pressure chamber is the decreasing volume pressure chamber, the second stage may occur towards the end of the relative movement to the extended position.

Optionally the actuator is configured such that the flow through the second outlet, out of the pressure chamber, is restricted relative to the flow through the first outlet, out of the pressure chamber. This may provide a particularly effective snubbing action, to slow the relative movement of the piston and housing. In this respect, the second outlet may be configured to provide a restricted flow of actuator fluid out of the respective pressure chamber, relative to the first outlet. For example, optionally the second outlet has a smaller cross-sectional area than the first outlet. Alternatively, or additionally, the second outlet may be shaped so as to provide said restricted flow. Alternatively, or additionally, a flow path out of the pressure chamber from the second outlet may provide a resistance to the flow of the actuator fluid out of the second outlet such that the flow through the second outlet, out of the respective pressure chamber, is restricted relative to the first outlet. This may, for example, be due to the pressure of actuator fluid in the connection.

Optionally the first and second pressure chambers are connected such that actuator fluid flows from the decreasing volume pressure chamber to the increasing volume pressure chamber. In embodiments of the invention this fluid flow is solely due to the movement of the piston relative to the housing.

The connection may reduce the amount of actuator fluid required by the actuator. This may allow the actuator to be relatively light weight and compact, which is particularly important in aircraft design. In addition, it may allow for an overall reduction in the size and power required of an actuator fluid system of an actuation system comprising the actuator.

Alternatively, or additionally, the connection may allow the actuator to be sealed with respect to the external atmosphere, in a relatively compact way, without requiring a complicated actuator fluid circuit.

Optionally the connection is configured such that actuator fluid flows from the decreasing volume pressure chamber to the increasing volume pressure chamber due to the movement of the piston relative to the housing from the other of the retracted and extended positions to the one of the retracted and extended positions under the action of a force on a landing gear assembly, when the actuator is arranged with a landing gear assembly so as to actuate the landing gear assembly.

Optionally the connection is configured such that actuator fluid flows from the decreasing volume pressure chamber to the increasing volume pressure chamber due to the movement of the piston relative to the housing from the one of the retracted and extended positions to the other by a resultant force on the piston due to the pressure of actuator fluid in the first and second pressure chambers.

Optionally the actuator is sealed with respect to the atmosphere. In this respect the actuator may be unvented. The first and second pressure chambers and the connection may be sealed with respect to the atmosphere. This may prevent the ingress of moisture, into the actuator, and freezing of this moisture during use of the aircraft landing gear assembly.

The connection may connect the first and/or second outlets of the second pressure chamber to the first and/or second outlets of the first pressure chamber. In this respect, the flow path may connect the first and second outlets of the second pressure chamber to the first and second outlets of the first pressure chamber. This may provide for a transfer of flow, from one pressure chamber to the other, that has a particularly high flow rate, thereby providing for a particularly high reduction in the amount of actuator fluid required.

Optionally both the first and second pressure chambers are associated with respective said first and second outlets. This may provide for the snubbing action in respect of both directions of movement of the piston relative to the housing, i.e. from the retracted position to the extended position and vice-versa.

Optionally the first and/or second outlets associated with the, or each, pressure chamber is also an inlet for actuator fluid. This may allow the actuator to be relatively compact whilst providing a relative high flow rate of actuator fluid into the actuator.

Optionally, in respect of the or each pressure chamber, the first and second outlets are provided in the housing, with the second outlet positioned outboard of the first outlet such that in the second stage of relative movement the piston closes the first outlet but not the second outlet. This may allow the actuator to be compact and reliable. Furthermore, because the first and second outlets are provided in the housing, this may allow for a particularly reliable way of providing the snubbing effect, that is easily accessible for inspection and maintenance.

Optionally the connection comprises an external connection that connects the first and/or second outlets associated with the second pressure chamber to the first and/or second outlets associated with the first pressure chamber. It will be appreciated that an 'external' flow path is a flow path that is external to the housing. This may allow for a relatively straightforward and reliable way of connecting the actuator to an actuator fluid system.

Optionally, in respect of the or each pressure chamber, one of the first or second outlets is provided in the piston rod and the other is provided in the piston, such that during the second stage of relative movement the first outlet is closed by a part of the actuator. This may allow the actuator to be relatively compact, as the outlets, that provide the snubbing action, and transfer path are provided within the housing.

Optionally both the first and second pressure chambers are associated with respective said first and second outlets, the outlets in the piston rod are connected by a first flow path and the outlets in the piston are connected by a second flow path such that the connection comprises the first and second flow paths. This may provide for a compact arrangement that still provides a high flow rate of actuator fluid between the pressure chambers.

Optionally the connection comprises an internal flow path. For example, the connection may pass across the piston. The connection may pass through the piston and/or piston rod. Such an arrangement may allow the actuator to be relatively compact.

Optionally the rear side of the piston, in relation to the direction of movement of the piston relative to the housing due to the pressure of actuator fluid in the first and second pressure chambers, has a greater exposed cross-sectional area than the front side of the piston. This may allow for a reduction in the overall size of the actuator, as the 'powered' direction of actuation is always performed on the side of the piston that has the greater cross-sectional area. In this case, the actuator fluid in the first and second pressure chambers may be pressurised, by the pump, to substantially the same pressure to move the piston being relative to the housing from one of the retracted and extended positions to the other. Alternatively, the pressure in the first and second chambers may be different.

Optionally the actuator fluid is hydraulic fluid. Alternatively, or additionally, the actuator fluid may be a pneumatic fluid (e.g. air).

According to a second aspect of the invention there is provided a single acting actuator for an aircraft landing gear assembly, the actuator comprising:
 a housing;
 a cavity provided in the housing;
 a piston and a piston rod connected to the piston;
 the piston being mounted in the cavity for relative movement with respect to the housing such that the piston and piston rod are movable relative to the housing between a retracted position and an extended position;
 the piston dividing the cavity into first and second pressure chambers such that the volume of one of the pressure chambers is increased and the volume of the other is decreased as the piston is moved relative to the housing;
 the piston being movable relative to the housing from one of the retracted and extended positions to the other by a resultant force on the piston due to the pressure of actuator fluid in the first and second pressure chambers;
 wherein the first and second pressure chambers are connected such that actuator fluid flows from the decreasing volume pressure chamber to the increasing volume pressure chamber;
 and wherein the actuator is arranged such that in respect of the relative movement in which the first and/or second pressure chambers is the decreasing volume pressure chamber, in a second stage of the relative movement the flow of actuator fluid out of the pressure chamber is restricted, relative to a first stage of the relative movement, thereby acting to slow the relative movement.

The second aspect of the invention recognises that an actuator for an aircraft landing gear assembly may only be required to generate an actuating force in a single direction (as with the first aspect of the invention). Furthermore, the slowing of the piston relative to the housing in the second stage of the relative movement may reduce impact loads on the actuator and/or landing gear assembly. The connection of the first and second pressure chambers may reduce the amount of actuator fluid required by the actuator. This may allow the actuator to be relatively light weight and compact, which is particularly important in aircraft design. In addition, it may allow for an overall reduction in the size and power required of an actuator fluid system of an actuation system comprising the actuator.

According to a third aspect of the invention there is provided an actuation system for an aircraft landing gear assembly, the actuation system comprising:
 an actuator according to the first or second aspects of the invention;
 an actuator fluid reservoir;
 and a pump;
 arranged such that the pump is operable to pump actuator fluid from the reservoir to the actuator so as to pressurise actuator fluid in at least one of the first and second pressure chambers so as to move the piston relative to the housing from the one of the retracted and extended positions to the other.

Optionally the connection does not pass through the pump.

Optionally the actuation system has a closed system of actuator fluid. In this respect, the actuator fluid system is sealed with respect to the atmosphere. The actuator fluid system is unvented.

Optionally the actuator is connected to a single inlet line, for supplying pressurised actuator fluid to at least one of the first and second pressure chambers.

Optionally the actuation system comprises an inlet line that connects the pump to the actuator, for supplying pressurised actuator fluid to at least one of the first and second pressure chambers;
 a return line that connects the actuator to the actuator fluid reservoir, for passing actuator fluid from the actuator to the fluid reservoir, and
 a flow control that is selectively controllable between an open configuration in which it allows for actuator fluid to pass from the actuator to the actuator fluid reservoir and a closed configuration in which it prevents said return flow.

Optionally the actuator is connected to the actuator fluid system by a single inlet line. This may allow for a reduction in weight due to fewer lines (e.g. pipes) and less actuator fluid required. It may also allow for fewer parts and so a more reliable system than in prior-art arrangements.

Optionally the actuator is a first single acting actuator and the actuation system comprises a second single acting actuator;
 the second actuator comprising:
  a housing;
  a cavity provided in the housing;
  a piston and a piston rod connected to the piston;

the piston being mounted in the cavity for relative movement with respect to the housing such that the piston and piston rod are movable relative to the housing between a retracted position and an extended position;

the piston dividing the cavity into first and second pressure chambers such that the volume of one of the pressure chambers is increased and the volume of the other is decreased as the piston is moved relative to the housing;

the piston being movable relative to the housing from one of the retracted and extended positions to the other by a resultant force on the piston due to the pressure of actuator fluid in the first and second pressure chambers;

wherein the second actuator, pump and actuator fluid reservoir are connected such that the pump is operable to pump actuator fluid from the reservoir to the second actuator so as to pressurise actuator fluid in at least one of the first and second pressure chambers so as to move the piston relative to the housing from the one of the retracted and extended positions to the other.

Optionally each of the first and second actuators is connected to a respective single inlet line, for supplying pressurised actuator fluid to at least one of the first and second pressure chambers of the actuator.

Optionally the actuation system comprises a flow control arrangement configured such that the actuation system is controllable between a first configuration in which the piston of one of the actuators is in its extended position and the piston of the other of the actuators is in its retracted position and a second configuration in which the piston of the one of the actuators is in its retracted position and the piston of the other of the actuators is in its extended position.

According to a fourth aspect of the invention there is provided an aircraft landing gear system comprising:

an aircraft landing gear assembly; and an actuation system according to the third aspect of the invention or an actuator according to the first or second aspects of the invention;

wherein the actuator is arranged such that the movement of the piston relative to the housing from the one of the retracted and extended positions to the other, by a resultant force on the piston due to the pressure of actuator fluid in the first and second pressure chambers, actuates the landing gear assembly from a first configuration to a second configuration;

the landing gear assembly is movable from the second configuration to the first configuration under the action of a force on the landing gear assembly;

and the actuator is arranged such that the movement of the landing gear assembly from the second configuration to the first configuration, under the action of said force, acts to move the piston relative to the housing from the other of the retracted and extended positions to said one of the retracted and extended positions.

Optionally the force on the landing gear assembly comprises the weight of at least one component of the landing gear assembly and/or aerodynamic force on the landing gear assembly.

Optionally the landing gear assembly comprises landing gear and/or a landing gear door.

Optionally the landing gear system comprises a lock that is movable between a locked configuration and an unlocked configuration so as to lock and unlock the landing gear assembly in the second configuration; and the second actuator is arranged to actuate the lock between its locked configuration and its unlocked configuration.

According to a fifth aspect of the invention there is provided an aircraft comprising an aircraft landing gear system according to the fourth aspect of the invention.

According to a sixth aspect of the invention there is provided a method of actuation of an aircraft landing gear assembly using a single acting actuator, the actuator comprising:

a housing;

a cavity provided in the housing;

a piston and a piston rod connected to the piston;

the piston being mounted in the cavity for relative movement with respect to the housing such that the piston and piston rod are movable relative to the housing between a retracted position and an extended position;

the piston dividing the cavity into first and second pressure chambers such that the volume of one of the pressure chambers is increased and the volume of the other is decreased as the piston is moved relative to the housing;

the piston being movable relative to the housing from one of the retracted and extended positions to the other by a resultant force on the piston due to the pressure of actuator fluid in the first and second pressure chambers;

wherein at least one of the pressure chambers is associated with first and second outlets, with the actuator being arranged such that, in respect of the relative movement in which the pressure chamber is the decreasing volume pressure chamber, in a first stage of the relative movement the first and second outlets are open thereby allowing actuator fluid to flow out of the pressure chamber through the first and second outlets and in a second stage of the relative movement the second outlet is open but the first outlet is closed, thereby acting to slow the relative movement of the piston with respect to the housing;

wherein the method comprises:

a) moving the piston relative to the housing from the one of the retracted and extended positions to the other, under the action of the pressure of actuator fluid in the first and second pressure chambers, so as to move the landing gear assembly from a first configuration to a second configuration; and b) moving the landing gear assembly from the second configuration to the first configuration under the action of a force on the landing gear assembly, thereby acting to move the piston relative to the housing from the other of the retracted and extended positions to said one of the retracted and extended positions.

According to a seventh aspect of the invention there is provided a method of actuation of an aircraft landing gear assembly using a single acting actuator, the actuator comprising:

a housing;

a cavity provided in the housing;

a piston and a piston rod connected to the piston;

the piston being mounted in the cavity for relative movement with respect to the housing such that the piston and piston rod are movable relative to the housing between a retracted position and an extended position;

the piston dividing the cavity into first and second pressure chambers such that the volume of one of the pressure chambers is increased and the volume of the other is decreased as the piston is moved relative to the housing;

the piston being movable relative to the housing from one of the retracted and extended positions to the other by a resultant force on the piston due to the pressure of actuator fluid in the first and second pressure chambers;

wherein the first and second pressure chambers are connected such that actuator fluid flows from the decreasing volume pressure chamber to the increasing volume pressure chamber;

and wherein the actuator is arranged such that in respect of the relative movement in which the first and/or second pressure chambers is the decreasing volume pressure chamber, in a second stage of the relative movement the flow of actuator fluid out of the pressure chamber is restricted, relative to a first stage of the relative movement, thereby acting to slow the relative movement;

wherein the method comprises:
  a) moving the piston relative to the housing from the one of the retracted and extended positions to the other, under the action of the pressure of actuator fluid in the first and second pressure chambers, so as to move the landing gear assembly from a first configuration to a second configuration; and
  b) moving the landing gear assembly from the second configuration to the first configuration under the action of a force on the landing gear assembly, thereby acting to move the piston relative to the housing from the other of the retracted and extended positions to said one of the retracted and extended positions.

Optionally the force on the landing gear assembly comprises the weight of one or more parts of the landing gear assembly and/or an aerodynamic force acting on one or more parts of the landing gear assembly.

It will of course be appreciated that features described in relation to one aspect of the present invention may be incorporated into other aspects of the present invention. For example, the method of any aspect of the invention may incorporate any of the features described with reference to the apparatus of any aspect of the invention and vice versa.

Other preferred and advantageous features of the invention will be apparent from the following description.

DESCRIPTION OF THE DRAWINGS

Embodiments of the present invention will now be described by way of example only with reference to the accompanying drawings of which:

FIGS. 3a to 3d are views corresponding to that of FIG. 1, but where the piston is sequentially shown moving from the retracted position to the extended position;

DETAILED DESCRIPTION

Figure 1:
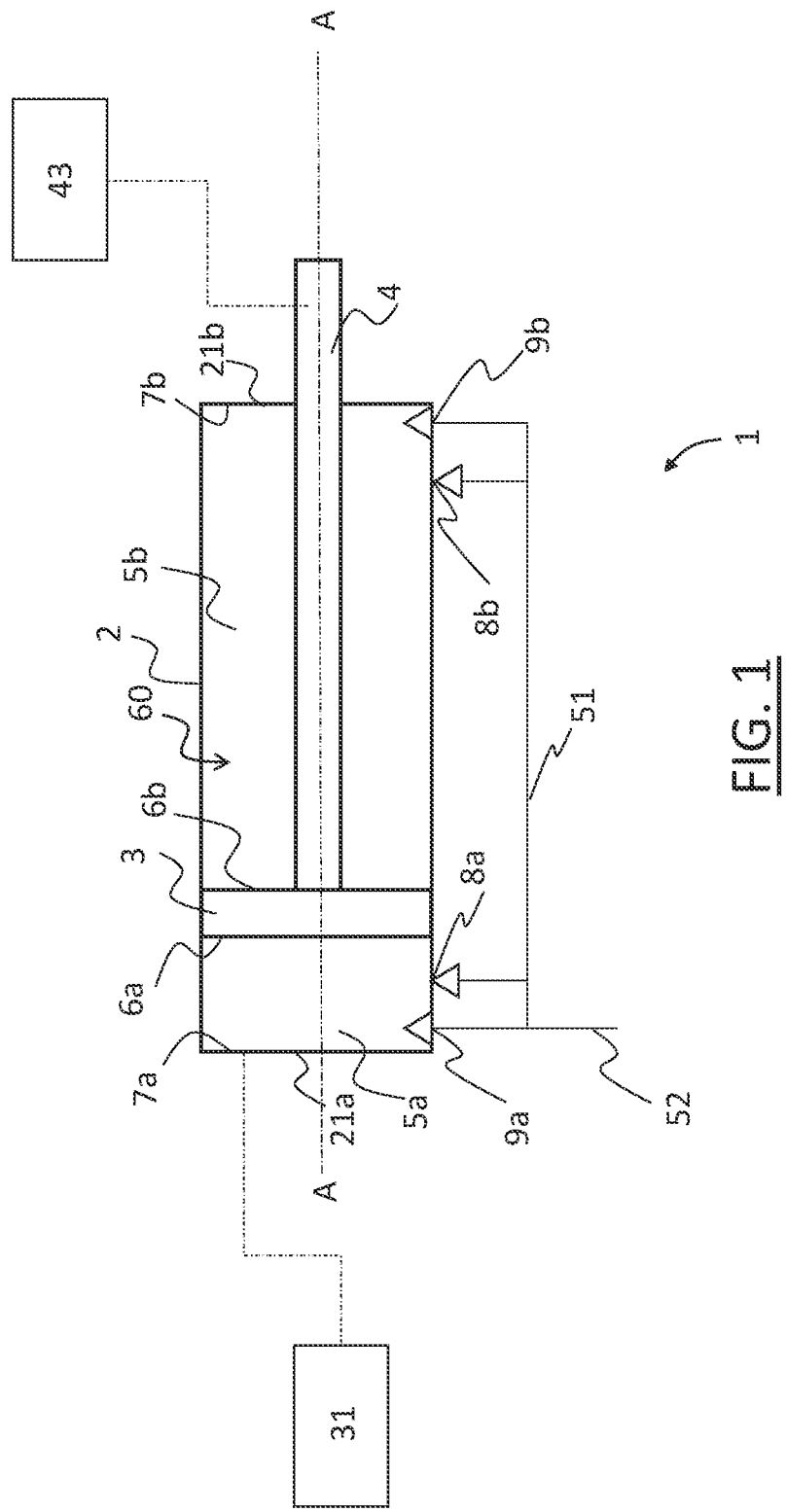
FIG. 1 shows a schematic view of a single acting actuator according to a first embodiment of the invention, where the piston is in an intermediate position between a retracted position and an extended position and where a part of an actuation system is shown.

Referring to FIG. 1 there is shown a schematic view of a single acting hydraulic actuator 1 according to a first embodiment of the invention. The actuator 1 is 'single acting' in that pressurised hydraulic fluid is used to drive the actuator 1 in a single direction only (in this case to drive the piston 3 and piston rod 4 from a retracted position to an extended position), as described in further detail below.

The actuator 1 comprises a hollow cylindrical housing 2 that extends from a first end 21a to a second end 21b along a central longitudinal axis A. A cylindrical cavity 60 is provided in the housing 2.

A piston 3 is slidably mounted in the cavity 60 for relative movement with respect to the housing 2. A piston rod 4 is connected to the piston 3 such that the piston rod 4 is fixed relative to the piston 3. In this respect, the piston 3 and piston rod 4 move together, relative to the housing 2. The piston rod 4 is attached to a second side 6b of the piston 3 (described in more detail below) and extends out of the second end 21b of the housing 2, through a bore in the second side 21b.

The piston 3 is slidably mounted in the cavity 60 for relative movement with respect to the housing 2, along the longitudinal axis A, such that the piston 3 and piston rod 4 are movable relative to the housing 2 between a retracted position (shown in FIG. 3a) and an extended position (shown in FIG. 3d). A seal (not shown) is provided between the piston 3 and the housing 2.

It will be appreciated that in the extended position the piston rod 4 extends further out of the second end 21b of the housing 2 than it does in the retracted position.

The housing 2 has a first interior side 7a (at the first end 21a of the housing 2) that faces an opposed first surface 6a of the piston 3. Similarly, the housing 2 has a second interior side 7b (at the second end 21b of the housing 2), that faces an opposed second surface 6b of the piston 3.

When the piston 3 is in its retracted position (shown in FIG. 3a) it is proximal to the first interior side 7a of the housing 2 and when the piston 3 is in its extended position it is proximal to the second interior side 7b of the housing 2.

The piston 3 divides the cavity 60 into first and second pressure chambers 5a, 5b such that the volume of one of the pressure chambers is increased and the volume of the other is decreased as the piston 3 is moved relative to the housing 2. In this respect, the housing 2 and piston 3 define a first pressure chamber 5a between the first side 6a of the piston 3 and the opposed first interior side 7a of the housing 2 and a second pressure chamber 5b between the second side 6b of the piston 3 and the opposed second interior side 7b of the housing 2.

The first and second pressure chambers 5a, 5b each have a first port 8a, 8b and a second port 9a, 9b. The first and second ports 8a, 9a of the first pressure chamber 5a are positioned towards the first interior side 7a of the housing 2 and the first and second ports 8b, 9b of the second pressure chamber 5b are positioned towards the second interior side 7b of the housing 2.

In respect of each pressure chamber 5a, 5b, the second port 9a, 9b is positioned outboard of the first port 8a, 8b. In this respect, the second port 9a, 9b is positioned between the first port 8a, 8b and the first or second opposed interior side 7a, 7b of the housing 2 respectively. The first and second ports 8a, 9a, 8b, 9b of the first and second pressure chambers 5a, 5b are connected to each other by an external connection in the form of a common hydraulic line 51 of an actuation system (as described in further detail below).

Figure 2:
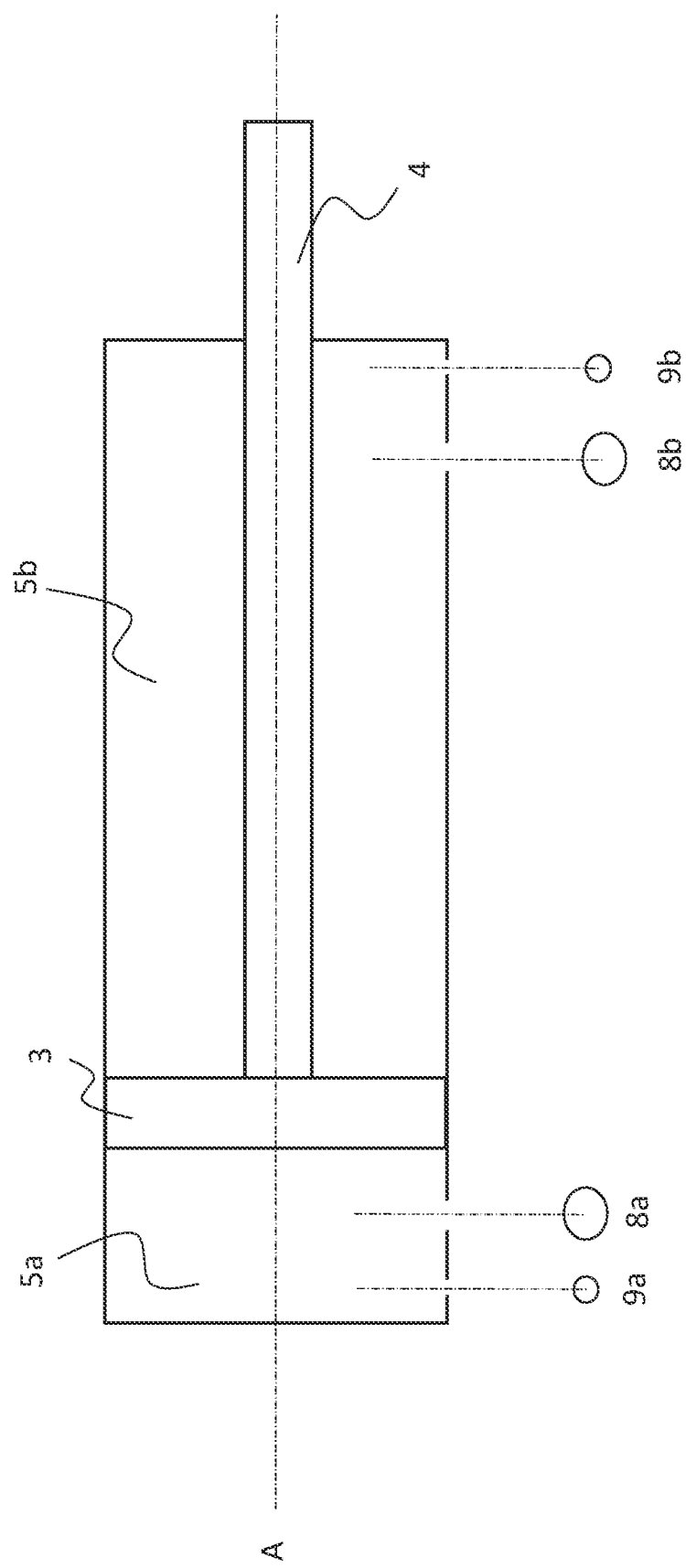
FIG. 2 is a view corresponding to FIG. 1, but showing the first and second ports, of each pressure chamber, in more detail, and where the cross-sectional shape of the outlets is shown beneath them.

Each port 8a, 8b, 9a, 9b is a respective aperture in the housing 2 that allows the passage of hydraulic fluid into and out of the respective pressure chambers 5a, 5b. In the currently described embodiment each port 8a, 8b, 9a, 9b is a circular aperture. In respect of each pressure chamber 5a, 5b, the second port 9a, 9b has a smaller cross-sectional area than the first port 8a, 8b (as shown in FIG. 2 and discussed further below).

Figure 7:
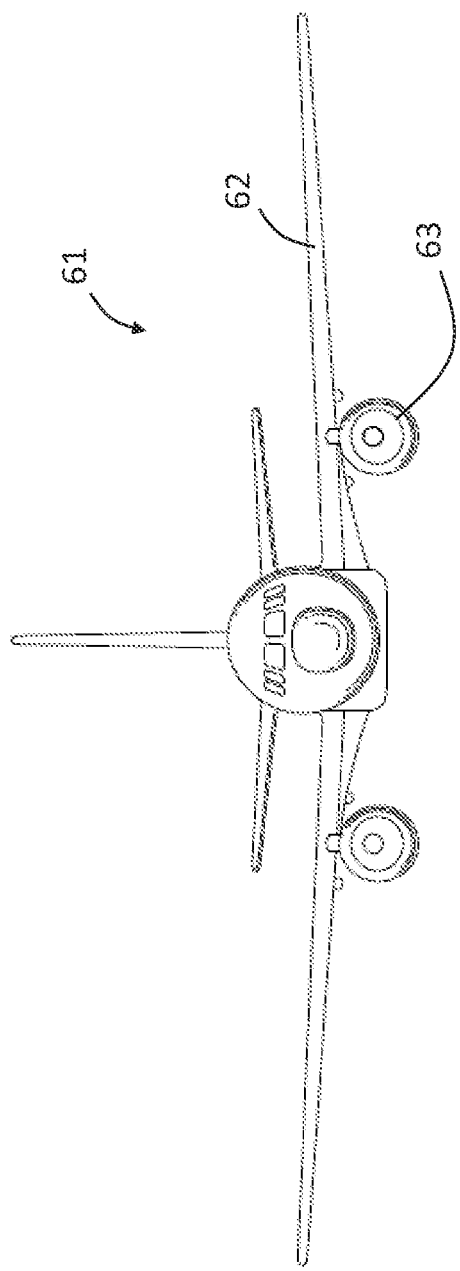
FIG. 7 shows an aircraft comprising a landing gear system according to an embodiment of the invention, where landing gear of the landing gear system is in a retracted configuration.

Referring to FIG. 7, there is shown a front view of an aircraft 61 according to an embodiment of the invention. The aircraft 61 is a passenger aircraft comprising a passenger cabin comprising a plurality of rows and columns of seat units for accommodating a multiplicity of passengers, in this case more than 50 passengers. The aircraft has a pair of the wings 62. The aircraft 61 is a powered aircraft and comprises engines 63, mounted under the wings 62, for propelling the aircraft 61. The aircraft 61 may be any type of aircraft, including any air vehicle, such as a manned aircraft or a UAV. However, the aircraft 61 is preferably a passenger aircraft.

Figure 8:
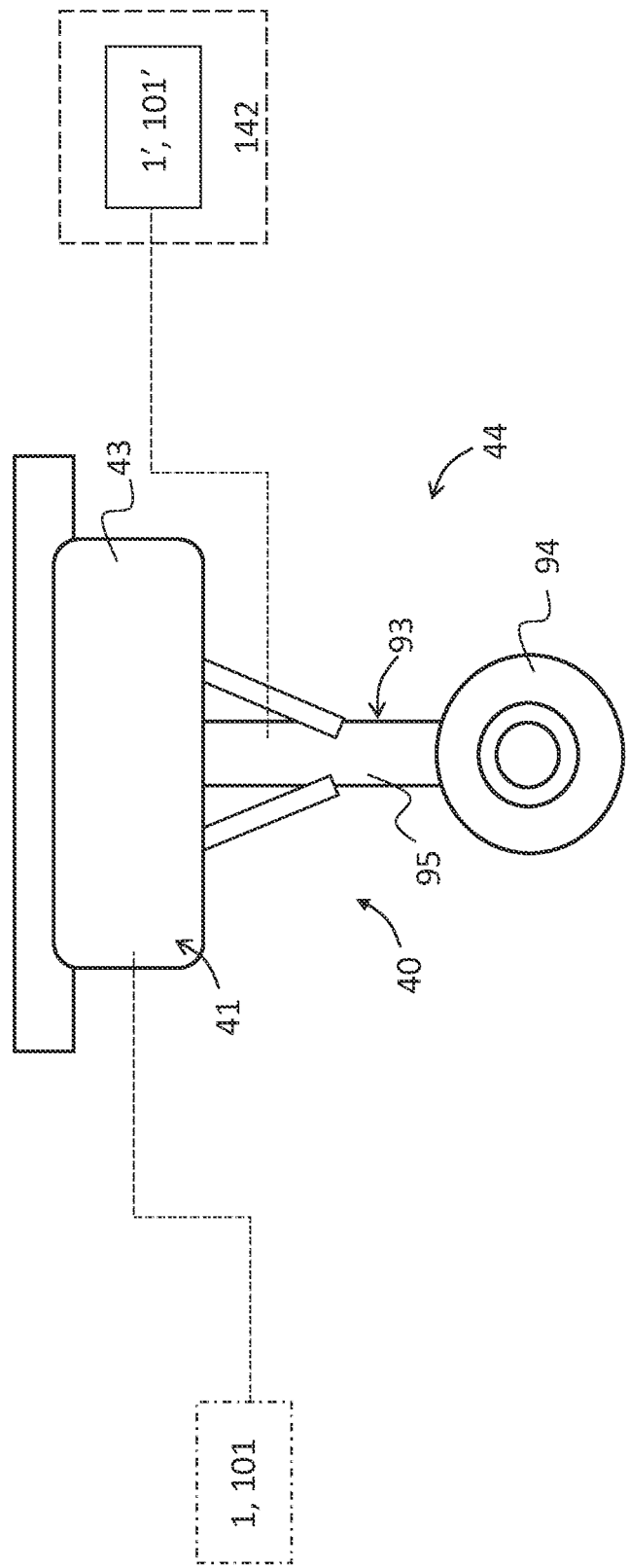
FIG. 8 shows a schematic side view of the landing gear of the landing gear system of the aircraft in FIG. 7, where the landing gear is in a deployed configuration.

Referring to FIG. 8, the aircraft 61 comprises a landing gear system 40. The landing gear system 40 comprises a first landing gear assembly 41 and a first actuation system 42 (shown in FIGS. 8 to 13) configured to actuate the first landing gear assembly 41.

In this respect, the first landing gear assembly 41 comprises a pair of landing gear bay doors 43 (only one of which is shown in FIG. 8) that are movable between an open configuration (as shown in FIG. 8) and a closed configuration (as shown in FIG. 7). The first actuation system 42 comprises the actuator 1 of the first embodiment (or of the second embodiment 101, described below), which is configured to actuate the bay doors 43 from their open position to their closed position.

In this respect, the actuator housing 2 is attached to a fixed anchor point 31 of the aircraft 61 (shown schematically in FIG. 1 by a dotted line that connects the housing 2 to a box labelled 31) and the piston rod 4 is mechanically connected to the bay doors 43 such that when the piston 3 (and piston rod 4) is in the extended position the bay doors 43 are in their closed configuration and when the piston 3 (and piston rod 4) is in its retracted position the bay doors 43 are in their open configuration. In FIG. 8 this mechanical connection is shown schematically by a dotted line connecting the actuator 1 to the bay doors 43. It will be appreciated that any suitable means of connection may be used to provide the desired kinematic movement of the bay doors 43.

Figure 9:
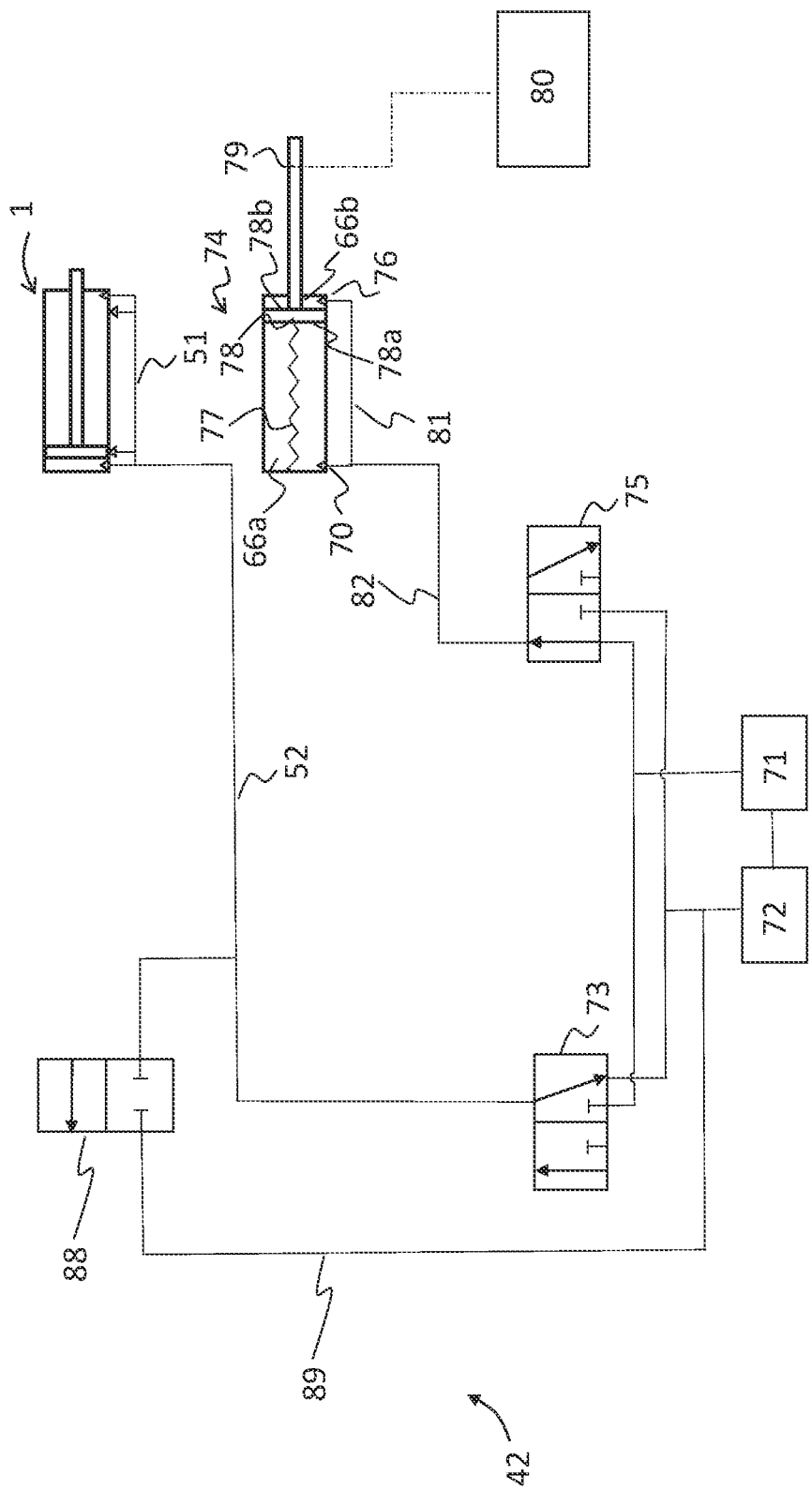
FIGS. 9 to 13 shows a fluid circuit diagram of an actuation system of the landing gear system in FIGS. 7 and 8, where the landing gear system is in various configurations.

Referring to FIG. 9, in the first actuation system 42 the first and second ports 8a, 9a, 8b, 9b of the first and second pressure chambers 5a, 5b are connected to each other by an external connection in the form of a common hydraulic line 51.

The common hydraulic line 51 is connected to a pump 71 via a first selector valve 73. In the currently described embodiment the selector valve is a three-way, two-position valve. However, it will be appreciated that any form of flow control may be used.

The first and second ports of each pressure chamber 5a, 5b are connected, by the common hydraulic line 51 to a single inlet line 52 that is selectively fluidly connectable to a pump 71 or hydraulic fluid reservoir 72 via the selector valve 73. The use of a single inlet line 52 may allow the actuation system 42, and the landing gear system 40, to be relatively simple, compact and reliable.

The first actuation system 42 also comprises second actuator 74, which is a single acting actuator that corresponds to the first actuator 1, except in that each pressure chamber only has a single port 70, 76 (which acts as an inlet and outlet for hydraulic fluid).

As with the first actuator 1, when the actuator 74 pressurised hydraulic fluid is supplied to the first and second pressure chambers 66a, 66b by the pump 71, the piston 78 (and piston rod 79) are moved to the extended position. However, in the second actuator 74 a spring 77 is arranged to move the piston 78 (and piston rod 79) to the retracted position when the actuator 74 is de-pressurised.

The ports 70, 76 of each pressure chamber are connected, by a common hydraulic line 81 to a single inlet line 82 that is selectively connectable to the pump 71 or hydraulic fluid reservoir 72 via a second selector valve 75. The use of a single inlet line 82 may allow the actuation system 42, and the landing gear system 40, to be relatively simple, compact and reliable.

The second actuator 74 is mechanically connected to an uplock 80 (shown schematically in FIG. 9) such that when the piston 78 (and piston rod 79) are in the extended position the uplock 80 is in an unlocked configuration in which the landing bay doors 43 are unlocked from their closed position and are able to move to their open position and when the piston 78 (and piston rod 79) are in the retracted position the uplock 80 is in a locked configuration in which the landing bay doors 43 are locked in their closed position.

In FIG. 9, the first landing gear assembly 41 is in a first configuration in which the landing gear bay doors 43 are in the open position and the uplock 80 is in its unlocked position. In this respect, the first selector valve 73 is in a position that connects the inlet line 52 (and therefore the first and second ports of the first and second pressure chambers 5a, 5b of actuator 1) to the reservoir 72 (and not to the pump 71). Accordingly the first actuator 1 is depressurised, the piston 3 (and piston rod 4) is in its retracted position and the landing gear bay doors 43 are in their open position (described in more detail below).

The second selector valve 75 is in a position that connects the ports 70, 76 of the second actuator 74 to the pump 71 such that pressurised hydraulic fluid is supplied by the pump 71 to the first and second pressure chambers of the second actuator 74. In this respect, as with the first actuator 1 (described below) the pump 71 pressurises the hydraulic fluid in the first and second pressure chambers 66a, 66b of the second actuator 74 to substantially the same pressure. The first side 78a of the piston 78 has an exposed surface area that is greater than the exposed surface area of the second side 78b of piston 78. Accordingly, as with the first actuator 1 (described below) this results in a net resultant force that moves the piston 78 (and piston rod 79) from its retracted position to its extended position, which thereby acts to move the uplock 80 from its locked position to its unlocked position.

Figure 10:
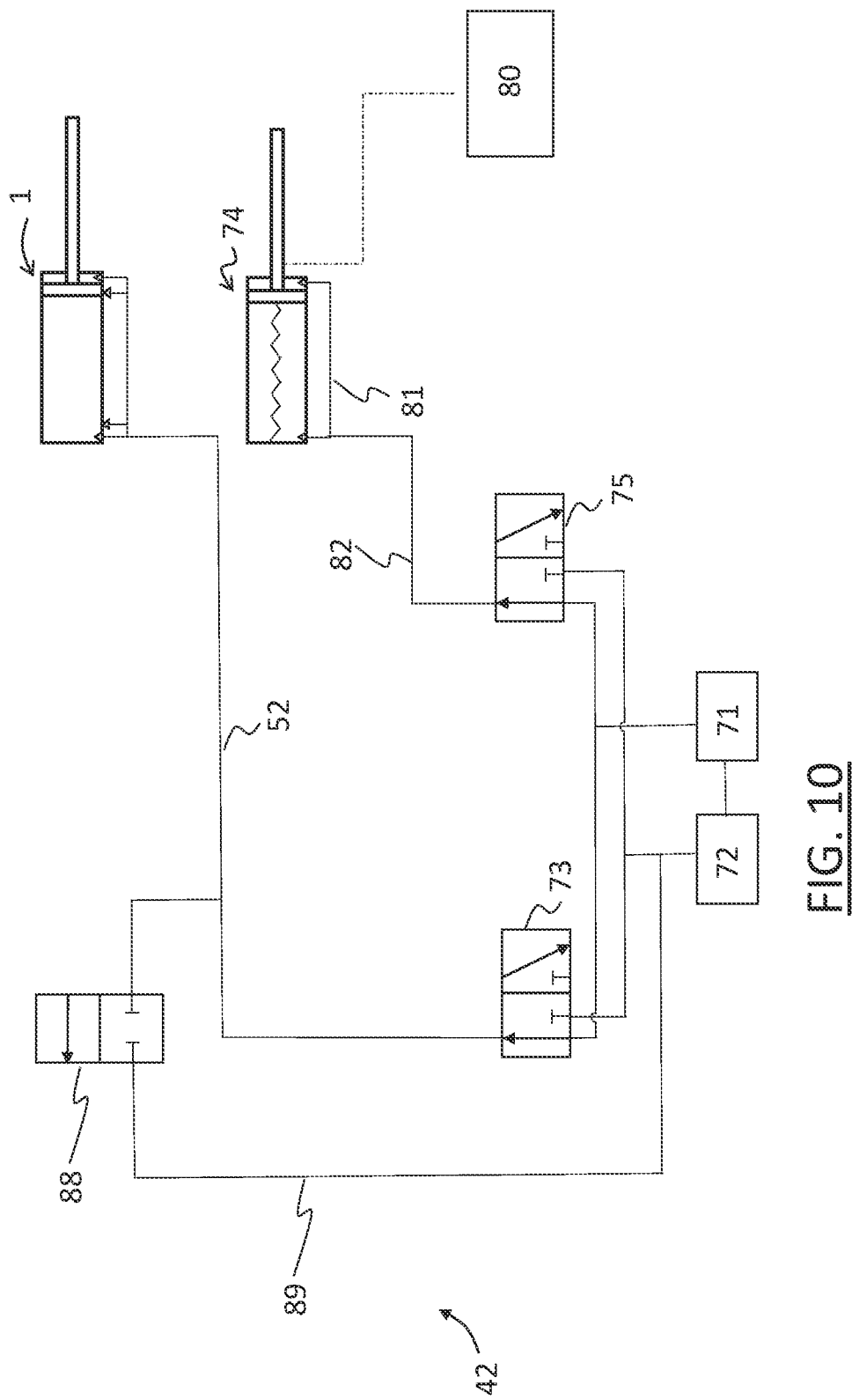

Referring to FIG. 10, in order to move the landing gear bay doors 43 from their open position to their closed position (in which the first landing gear assembly 42 is in a second configuration), the first selector valve 73 is moved to a position in which it connects the pump 71 to the first and second ports of the first and second pressure chambers 5a, 5b of the first actuator 1.

Referring to FIG. 3a, the pump 71 pressurises the hydraulic fluid in the first and second pressure chambers 5a, 5b to substantially the same pressure P1.

The first side 6a of the piston 3 has an exposed surface area (A1) that is greater than the exposed surface area (A2) of the piston 3 on its second side 6b. In this respect, it will be appreciated that the first side 6a of the piston 3 is a circular disc, with an exposed surface area (A1) and the second side 6b is an annular surface (that as a corresponding disc shape but with the central circular cross-sectional area of the piston rod 4 removed from it).

Since the first side 6a of the piston 3 has a greater exposed surface area (A1) than the second side 6b, the force (F1) acting on the first side 6a of the piston 3 due to the pressure (P1) in the first pressure chamber 5a is greater than the force (F2) acting on the second side 6b of the piston 3 due to the pressure (P2) in the second pressure chamber 5b. This results in a net resultant force that moves the piston 3 (and piston rod 4) from its retracted position to its extended position, which thereby acts to move the bay doors 43 from their open position to their closed position.

It will be appreciated that, in relation to the direction of the movement of the piston 3 relative to the housing 2, under the action of the hydraulic fluid in the first and second pressure chambers 5a, 5b, at substantially the same pressure P1, (shown in FIG. 3a by the arrow labelled 'M'), the first side 6a of the piston 3 is the 'rear' side of the piston 3 and the second side 6b is the 'front' side. It will also be appreciated that if, in an alternative arrangement, the piston 3 was stationary but the housing 2 moved to provide said relative movement then the direction of the movement of the piston 3 relative to the housing 2 would be in the same direction (M). Therefore the first side 6a of the piston 3 would still be the 'rear' side and the second side 6b the 'front' side.

As the rear side of the piston 3 has a greater cross-sectional area than the front side, this may allow for a reduction in the overall size of the actuator 1, as the 'powered' direction of actuation is always performed on the side of the piston 3 that has the greater cross-sectional area.

The first and second ports 8b, 9b of the second pressure chamber 6b are positioned such that as the piston 3 is moved from its retracted position, towards the first port 8b of the second pressure chamber 6b, the first and second ports 8b, 9b (of the second pressure chamber 5b) are open, allowing hydraulic fluid to flow out of the second pressure chamber 5b through the first and second ports 8b, 9b (as shown in FIGS. 3a and 3b). The hydraulic fluid is conveyed out of the second pressure chamber 6b due to the movement of the piston 3.

The hydraulic fluid passing out of the first and second ports 8b, 9b of the second pressure chamber 5b is conveyed to the first pressure chamber 5a, through the first and second ports 8a, 9a of the first pressure chamber, via the common hydraulic line 51. In this respect, it will be appreciated that the first and second ports of each of the chambers 5a, 5b are also inlets. This return flow path (R) of the hydraulic fluid may advantageously reduce the amount of hydraulic fluid required to be delivered by the pump 71, thereby reducing the overall size of the landing gear system.

Also, the return flow path (R) allows the actuation system to have a closed system of hydraulic fluid. In this respect, the actuator 1 is unvented. The actuator 1 is sealed. The first and second pressure chambers 5a, 5b are not open to the atmosphere and the return flow path (R) is not open to the atmosphere. The only inlets and outlets to the pressure chambers 5a, 5b are provided by the respective first and second ports 8a, 8b, 9a, 9b. This closed system of hydraulic fluid prevents the ingress of moisture and freezing during use of the aircraft landing gear assembly 41.

When the piston 3 reaches the first port 8b of the second pressure chamber 5b (as shown in FIG. 3c), it acts to block the port 8b, thereby preventing the flow of hydraulic fluid out of the second pressure chamber 5b through the first port 8b. The piston 3 continues to block the first port 8b as the piston 3 continues to the extended position (shown in FIG. 3d). When the piston 3 is in the extended position it does not block the second port 9b (of the second pressure chamber 5b).

In this respect, once the piston 3 has reached the first port 8b, and during subsequent movement of the piston 3 to the extended position, hydraulic fluid is only able to flow out of the second pressure chamber 5b through the second port 9b.

The second port 9b is configured to provide a restricted flow of hydraulic fluid out of the second pressure chamber 5b, relative to the first port 8b. In this respect, the second port 9b has a smaller cross-sectional area than the first port 8b (as described above). The restricted flow acts to slow the subsequent movement of the piston 3 to the extended position, thereby slowing the movement of the bay doors 43 to their closed position. Accordingly this provides a snubbing effect during the closing of the bay doors 43.

Figure 11:
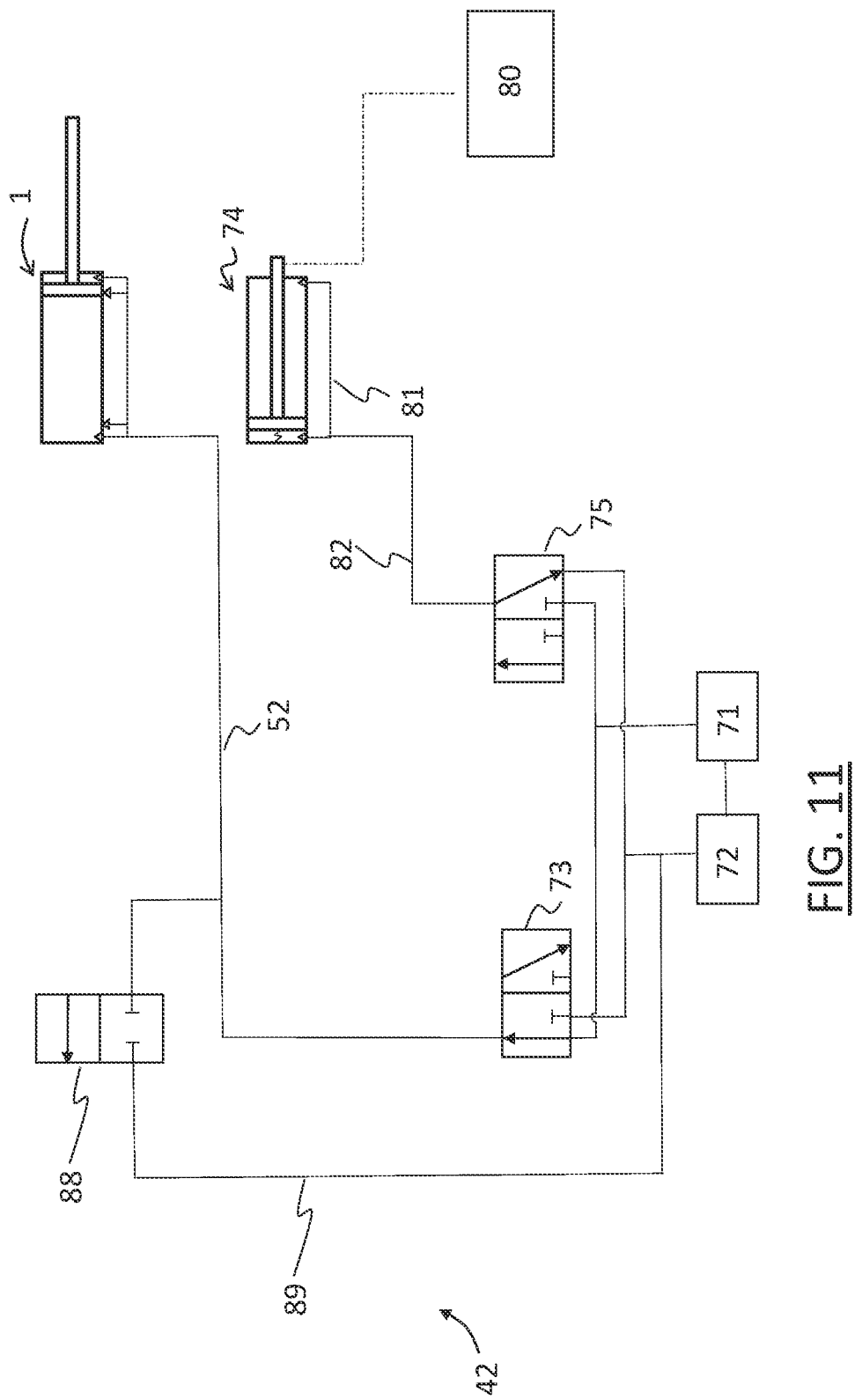
Figure 12:
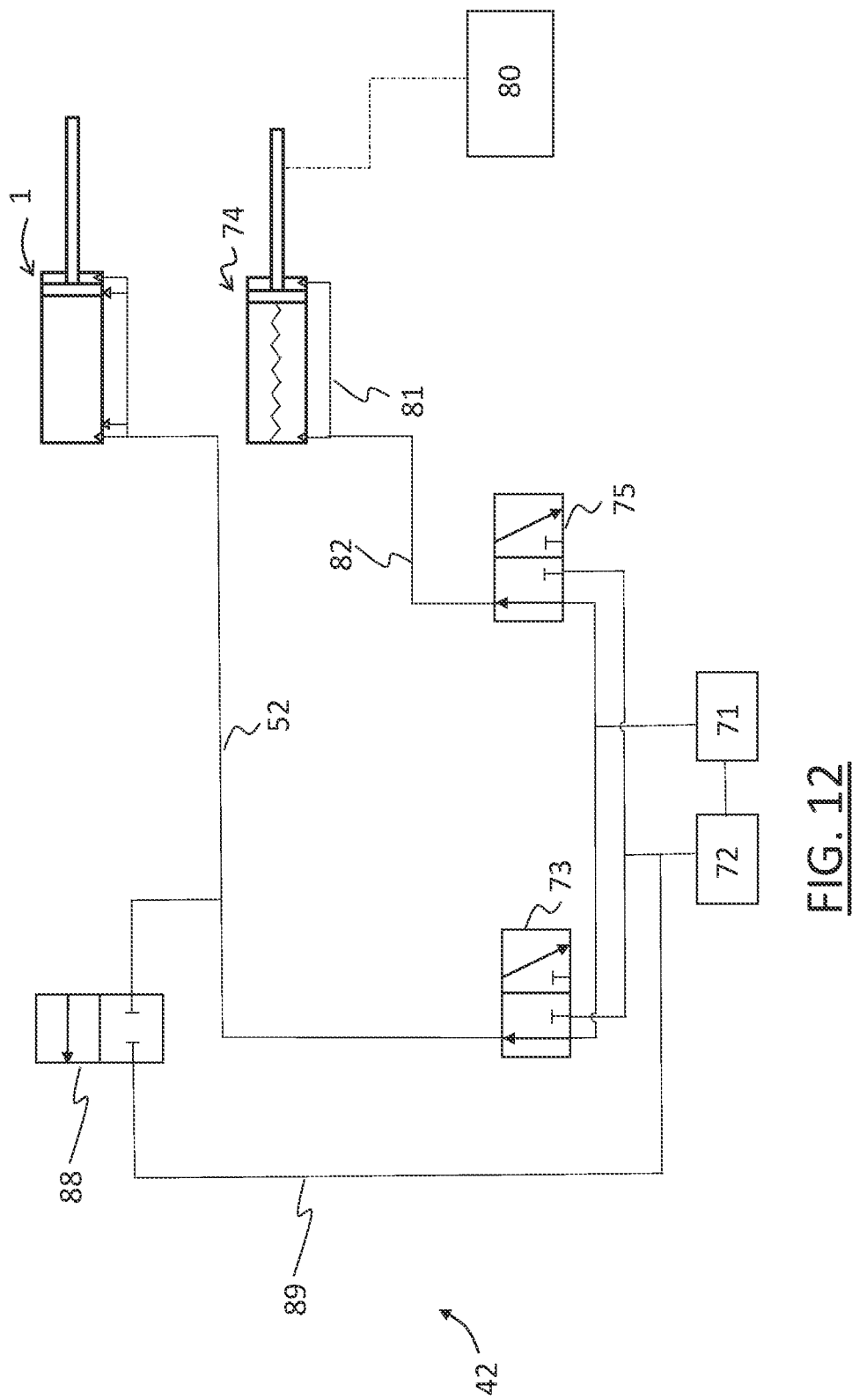

In order to lock the bay doors 43 in their closed position, the second actuator 74 is depressurised, by moving the selector valve 75 to the position shown in FIG. 11 in which the inlet line 82 is disconnected from the pump 71 and connected to the fluid reservoir 72.

This causes the spring 77 to move the piston 78 and piston rod 79 to their retracted position, thereby moving the uplock to the locked position. This locks the landing gear bay doors 43 in their closed position.

In order to move the bay doors 43 from their closed position to their open position, a 'load-relief' method is employed. In this respect, the first selector valve 73 is positioned as shown in FIG. 11, so as to pressurise the first actuator 1. This acts to pull the doors 43 closed (load relief). The second selector valve 75 is then moved to the position shown in FIG. 12, so as to pressurised the second actuator 74, to move the uplock 80 to its unlocked position.

Figure 13:
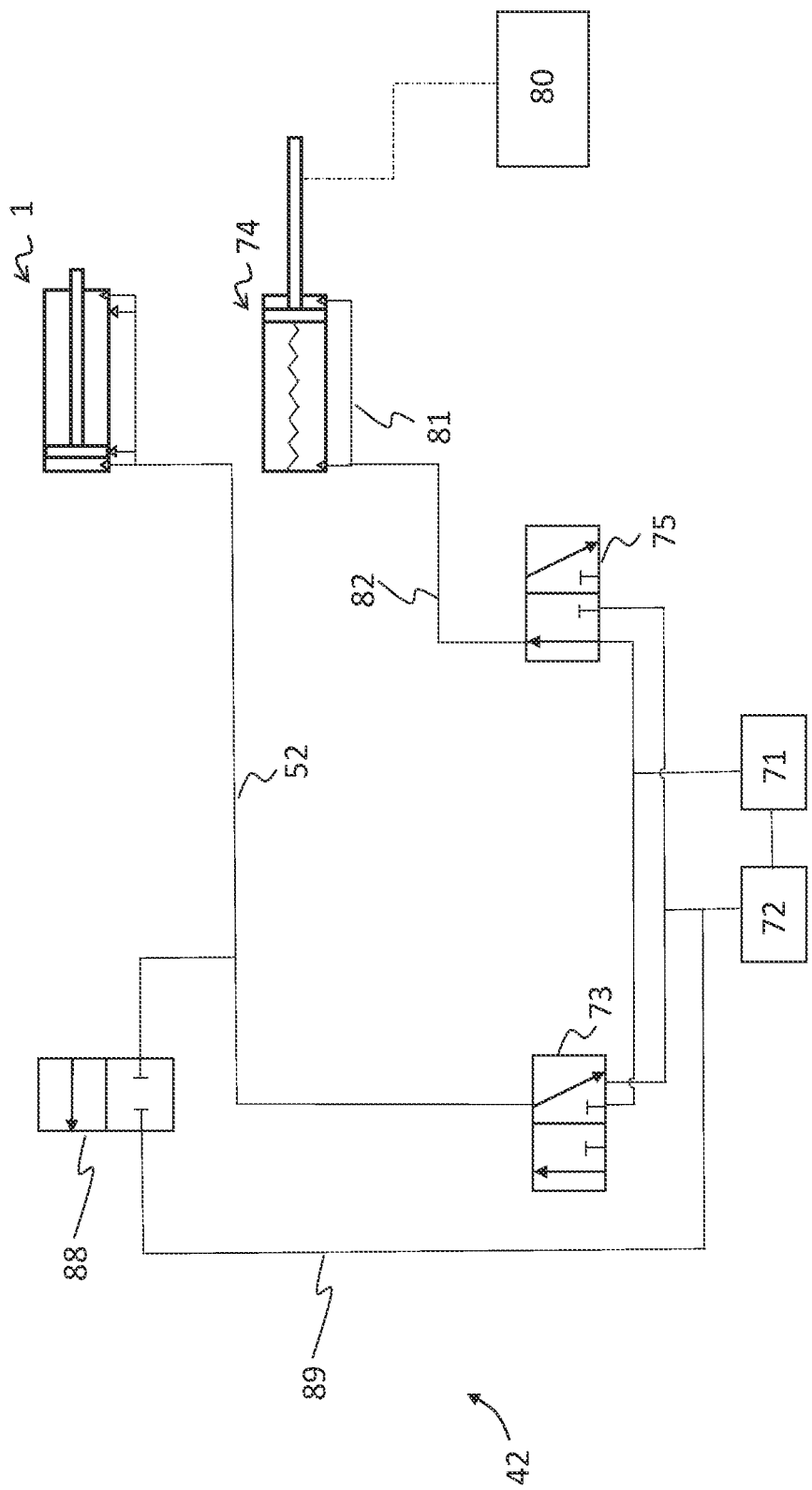

The first selector valve 73 is then moved to the position shown in FIG. 13, in which the first actuator 1 is disconnected from the pump 71 and connected to the fluid reservoir 72, so as to depressurise the first actuator 1. The bay doors 43 are then moved, under their own weight, as well as aerodynamic loads, from their closed position to their open position.

The invention recognises that the first actuator 1 is not required to actively drive the bay doors 43 from their closed position to the open position and so a single acting actuator 1 may be used to actuate the bay doors 43.

Figure 4A:
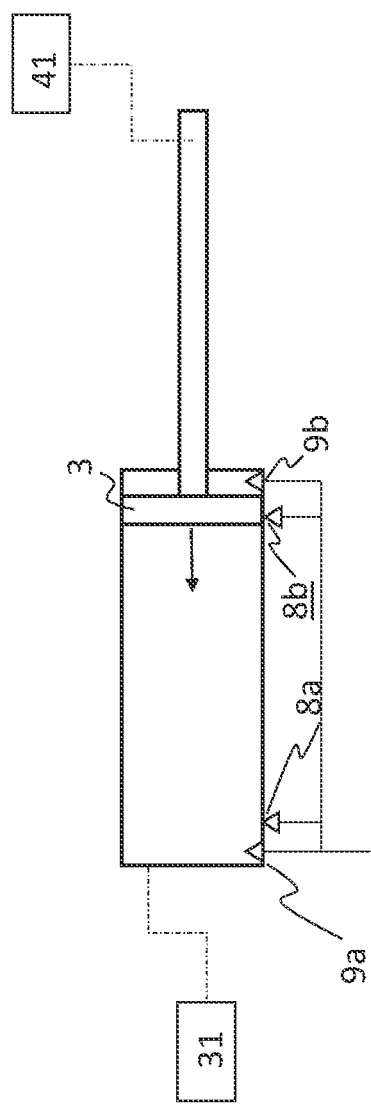
FIGS. 4a to 4d are views corresponding to that of FIG. 1, but where the piston is sequentially shown moving from the extended position to the retracted position.
Figure 4B:
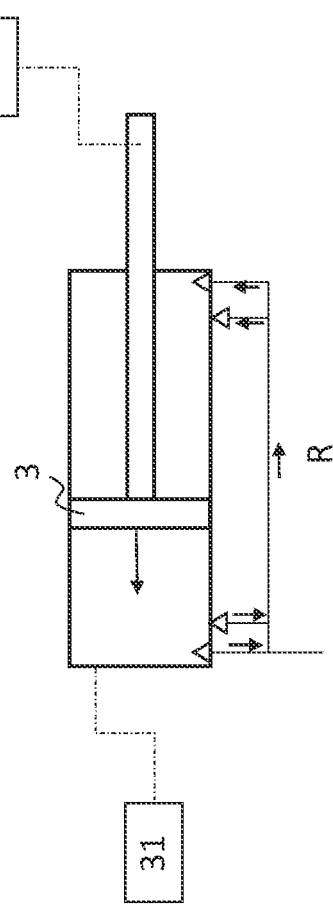

In a corresponding manner to the second pressure chamber 5b, the first and second ports 8a, 9a of the first pressure chamber 5a are positioned such that, during movement from the extended position to the retracted position, as the piston 3 is moved from its extended position, towards the first port 8a, the first and second ports 8a, 9a are open, allowing hydraulic fluid to flow out of the first pressure chamber 5a through the first and second ports 8a, 9a (as shown in FIGS. 4a and 4b).

The hydraulic fluid passing out of the first and second ports 8a, 9a of the first pressure chamber 5a is conveyed to the second pressure chamber 5b, through the first and second ports 8b, 9b of the second pressure chamber, via the common hydraulic line 51, due to the movement of the piston 3.

Figures 4C, 4D:
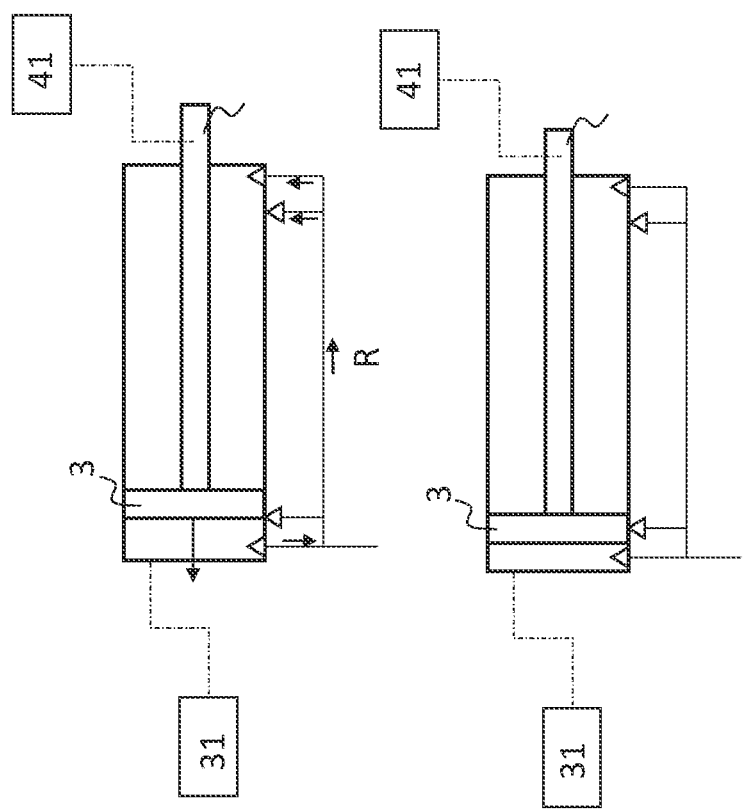

When the piston 3 reaches the first port 8a (as shown in FIG. 4c), it acts to block the first port 8a, thereby preventing the flow of hydraulic fluid from the first pressure chamber 5a, through the first port 8a. The piston 3 continues to block the first port 8a as the piston 3 continues to move to the retracted position (shown in FIG. 4d).

When the piston 3 is in the retracted position it does not block the second port 9a (of the first pressure chamber 5b). In this respect, once the piston 3 has reached the first port 8a, and during subsequent movement of the piston 3 to the retracted position, hydraulic fluid is only able to flow out of the first pressure chamber 5a through the second port 9a.

The second port 9a is configured to provide a restricted flow of hydraulic fluid out of the first pressure chamber 5a, relative to the first port 8a. In this respect, the second port 9a has a smaller cross-sectional area than the first port 8a (as described above and shown in FIG. 2). The restricted flow acts to slow the subsequent movement of the piston 32 to the retracted position, thereby slowing the movement of the landing gear bay doors 43 to their open position. Accordingly this provides a snubbing effect during the opening of the landing gear bay doors 43.

The actuation system 42 also comprises an emergency bypass line 89 (see FIG. 9) that connects the inlet line 52, at a point downstream stream of the first selector valve 73 but upstream of the first actuator 1, to the fluid reservoir 72. A combined vent and door bypass valve 88 is located in the emergency bypass line 89 and is selectively movable between an open position, which allows hydraulic fluid to flow from the actuator 1 along the emergency line 89 to the reservoir 72, and a closed position which prevents said flow, by a pilot input (i.e. an input made by a pilot of the aircraft).

In this respect, in the event of a failure of the landing gear system, which results in a loss of pressure in the system, the aircraft pilot, using the pilot input, may move the valve 88 to its open position. This provides for freefall extension of the bay doors 43, under gravity and aerodynamic loads on the bay doors 43, as it allows the hydraulic fluid to flow directly out of the first pressure chamber 5a to the fluid reservoir 72.

Figure 5:
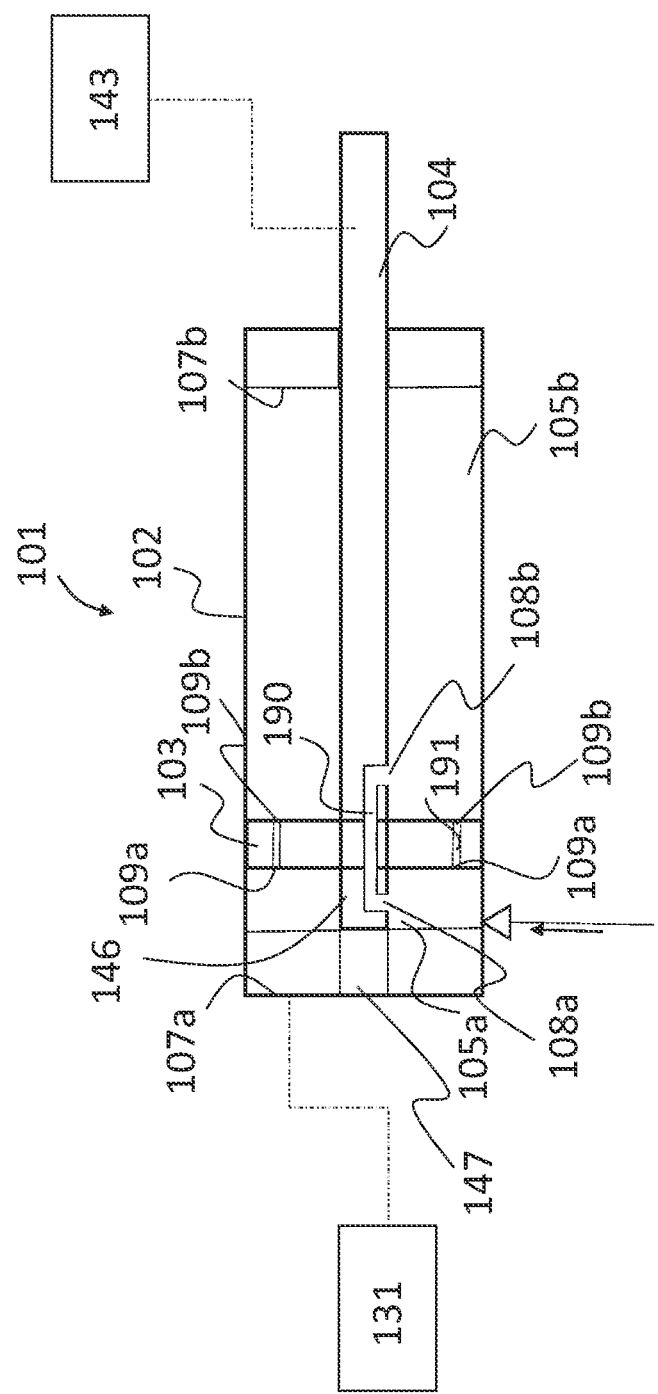
FIG. 5 is a schematic view of a single acting actuator according to a second embodiment of the invention, where the piston is in an intermediate position between a retracted position and an extended position and where a part of an actuation system is shown.

Referring to FIG. 5 there is shown a schematic view of an actuator 101 according to a second aspect of the invention. The actuator of the second aspect has corresponding features to those of the first aspect, except for the differences described below. Corresponding features are provided with corresponding reference numerals, but incremented by 100.

The actuator 101 of the second embodiment has corresponding features to those of the first embodiment expect in that it has a different arrangement of first and second ports, to provide the snubbing effect.

In this respect, the first port 108a, 108b of each chamber 105a, 105b is provided in the piston rod 104, with the first ports 108a, 108b connected by an internal connecting flow path 190, that passes through the piston rod 104.

The second ports 109a, 109b of the first and second chambers 105a, 105b are provided in the first and second sides of the piston 103 respectively and are connected by an internal connecting flow path 191.

Figure 6:
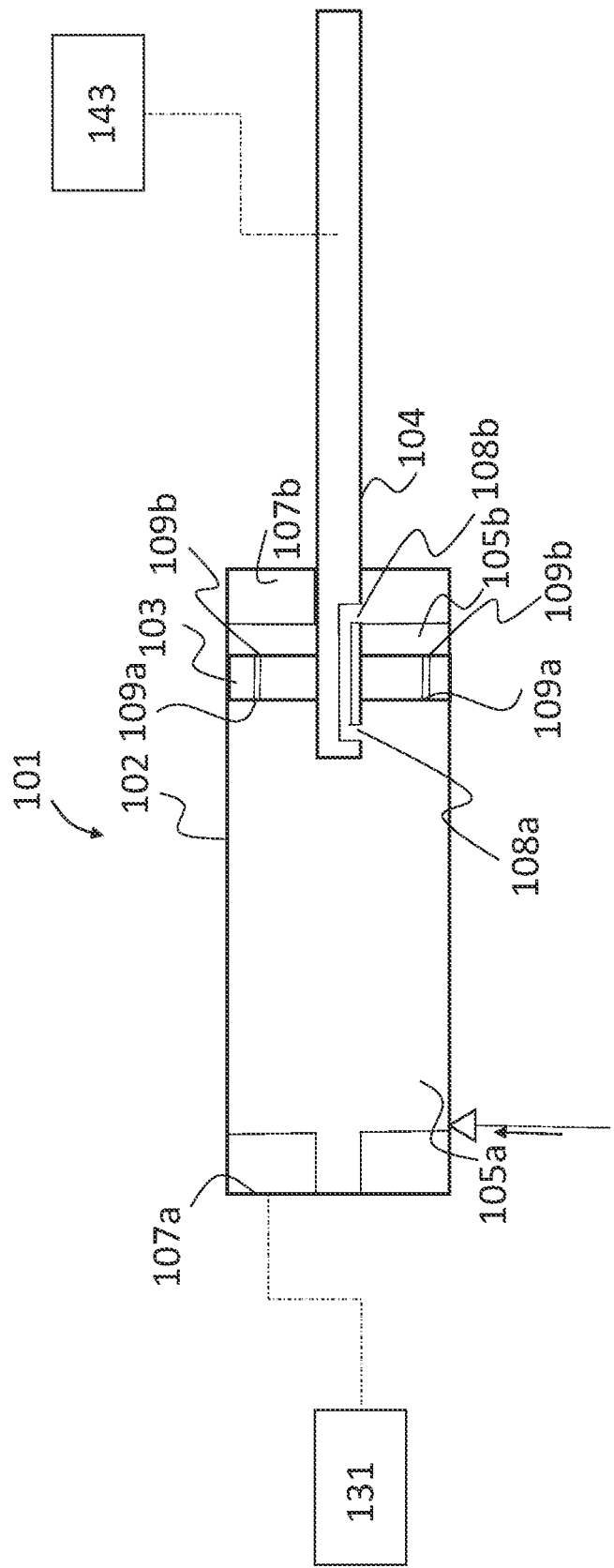
FIG. 6 is a view corresponding to FIG. 5 but where the piston (and piston rod) is in an its extended position.

As the piston 103 and piston rod 104 near the extended or retracted position, the first port 108a, 108b of the decreasing volume chamber is blocked by the end of the housing 102 (as shown in FIG. 6 for the extended position—it will be appreciated that in the retracted position the end 146 of the piston rod 104 that extends rearwardly of the piston 103 is received in a bore 147 at the first end of the housing 102), thereby preventing flow through the first port 108a, 108b (and connecting flow path 190), such that hydraulic fluid may only flow out of the chamber (and into the increasing volume chamber) through the second port 109a, 109b (and connecting flow path 191). As with the first embodiment, in respect of each chamber the second port 109a, 109b has a smaller cross-sectional area than the first ports 108a, 108b. Accordingly, the flow of hydraulic fluid out of the decreasing volume chamber is restricted as the piston 3 nears its extended or retracted positions, thereby providing the same snubbing effect as in the first embodiment of the invention.

A second landing gear assembly 44 comprises landing gear 93 that is movable between a deployed configuration (shown in FIG. 8) and a retracted configuration (shown in FIG. 7). The landing gear 93 comprises a pair of wheels 94 rotatably mounted on an end of a landing gear strut assembly 95. When the landing gear 93 is in its deployed configuration, the aircraft 61 is in a configuration for movement along the ground (e.g. during landing, take off and taxiing), with the landing gear 93 supporting the weight of the aircraft 61. When the landing gear 93 is in its retracted configuration it is retracted within the aircraft 61 (e.g. within the fuselage and/or wings of the aircraft) to provide a configuration of the aircraft for flight (e.g. to reduce drag on the aircraft).

A second actuation system 142 (shown schematically in FIG. 8), which has corresponding features to the first actuator system (i.e. it comprises a second pair of said first and second actuators 1, 101, 74 arranged in a corresponding hydraulic fluid circuit), is used in a corresponding way to actuate the landing gear 93 between its deployed and retracted configurations (and to lock and unlock the landing gear 93 in its retracted configuration).

It will be appreciated that the actuator 1 may be used with any type of landing gear, including nose landing gear and main (rear) landing gear. The landing gear may have one or more wheels, skis, etc.

It will also be appreciated that the actuator may be used to actuate different landing gear assemblies to those referred to above and is not limited to the use with landing gear or landing gear bay doors.

The present invention recognises that an actuator for an aircraft landing gear assembly may only be required to generate an actuating force in a single direction. For example an actuating force may only be required to retract a landing gear assembly (for example landing gear or landing gear bay doors), with the deployment primarily achieved by the weight the landing gear assembly and/or aerodynamic force on the landing gear assembly.

The arrangement of the first and second outlets of the first and second pressure chambers, to slow the movement of the piston relative to the housing in the second stage of the relative movement, may slow the relative movement of the piston and housing towards the end of travel of the actuator, to the retracted and/or extended positions, which may thereby reduce impact loads on the actuator and/or landing gear assembly. In this respect, the first and second outlets provide a snubbing effect. This is particularly important, when used to actuate a landing gear assembly, due to the typically high loads involved (e.g. due to relatively high weight of the landing gear assembly and/or the relatively high aerodynamic forces on the landing gear assembly).

The provision of the first and second outlets may provide a particularly effective means of snubbing a single acting actuator. In this respect, the provision of first and second outlets may allow for a relatively high flow rate of actuator fluid out of the decreasing volume pressure chamber during the first stage of relative movement whilst also allowing for a relatively large reduction in the outlet flow rate during the second stage. Also the first and second outlets may be positioned relative to each other so as to provided for a desired snubbing behaviour throughout the movement of the piston relative to the housing, based on the requirements of the actuation.

Furthermore, since the actuator 1, 101 uses return flow of the hydraulic fluid, from one pressure chamber to the other, this may advantageously reduce the amount of hydraulic fluid required by the actuator 1, 101. This may allow the actuator 1, 101 to be relatively simple and compact, which is particularly important in aircraft design. In addition, it may allow for an overall reduction in the size and power required of an actuator fluid system of an actuation system comprising the actuator.

Alternatively, or additionally, the connection may allow the actuator to be sealed with respect to the external atmosphere, in a relatively compact way, without requiring a complicated actuator fluid circuit. The use of a sealed actuator may prevent the ingress of moisture, into the actuator, and freezing of this moisture during use of the aircraft landing gear assembly.

Whilst the present invention has been described and illustrated with reference to particular embodiments, it will be appreciated by those of ordinary skill in the art that the invention lends itself to many different variations not specifically illustrated herein.

For example, in the described embodiments the housing 2 is attached to a fixed anchor point 31 of the aircraft 61 and the piston rod 4 is attached to the bay doors or landing gear such that, as the piston 3 moves between its extended and retracted positions, the piston 3 moves and the housing 2 is stationary. However, it will be appreciated that any arrangement that provides for relative movement of the piston 3 (and piston rod 4) and housing 2, between the extended and retracted positions, may be used. In this respect the housing 2 may be moved and the piston 3 may be stationary, or both the piston 3 and housing 2 may be moved, so as to provide this relative movement. For example, in a reverse arrangement the piston 3 may be attached to the anchor point 31, with the actuator housing 2 connected to the bay doors or landing gear. In this case the piston 3 will be stationary (relative to the anchor point 31) with the housing 2 moving so as to effect the movement of the bay doors or landing gear.

In the described embodiments the piston 3 and housing 2 are movable relative to each other from the retracted position to the extended position under the action of pressure of actuator fluid in the first and second pressure chambers and are movable relative to each other from the extended position to the retracted position by movement of the landing gear assembly due to a force acting on the landing gear assembly (e.g. force due to gravity and/or aerodynamic forces). Alternatively, in a reverse arrangement, the piston and housing may be movable relative to each other from the extended position to the retracted position under the action of pressure of actuator fluid in the first and second pressure chambers and movable relative to each other from the retracted position to the extended position by movement of the landing gear assembly due to a force acting on the landing gear assembly (e.g. force due to gravity and/or aerodynamic forces).

In the described embodiments the piston and housing are moved relative to each other from the retracted position to the extended position actuator fluid by pressurising the actuator fluid in the first and second pressure chambers 5a, 5b to substantially the same pressure P1, with the first side 6a of the piston 3 having an exposed surface area (A1) that is greater than the exposed surface area (A2) of the piston 3 on its second side 6b so that a net resultant force moves the piston 3 (and piston rod 4) from its retracted position to its extended position. Alternatively, the pressure chambers may be provided with different pressures of actuator fluid so as to move the piston and housing relative to each other from the retracted position to the extended position (or from the extended position to the retracted position). In this case, the first and second sides 6a, 6b of the piston may have the same (or different) exposed cross-sectional areas.

In the described embodiments, in respect of each chamber, the second port 9a, 9b has a smaller cross-sectional area than the first port 8a, 8b, so as to restrict the outlet flow relative to the first port. However, any suitable arrangement may be used to provide this restricted flow. For example, a flow path out of the pressure chamber 5a, 5b from the second port 9a, 9b may provide a resistance to the flow of the actuator fluid out of the second port 9a, 9b such that the flow through the second port 9a, 9b, out of the respective pressure chamber 5a, 5b, is restricted relative to the first port 8a, 8b. This may, for example, be due to the pressure of actuator fluid in the flow path.

Alternatively, in respect of one or both pressure chambers, the flow through the second port may not be restricted relative to the flow through the first port. In this respect, the first and second ports may have the same cross-sectional size and shape.

In the currently described embodiments the return flow path connects the first and second ports 8b, 9b of the second pressure chamber 5b to the first and second ports 8a, 9a of the first pressure chamber 5a. This may provide an especially high return flow rate of actuator fluid, thereby providing for a particularly high reduction in the amount of actuator fluid required. However, it will be appreciated that the return flow path may connect the first and/or second ports of the second pressure chamber to the first and/or second ports of the first pressure chamber, to provide the return flow.

In the currently described embodiment the hydraulic fluid is oil. However, it will be appreciated that any suitable actuation fluid may be used, including a hydraulic fluid and/or pneumatic fluid (e.g. air).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments. Where 'or' is used in the foregoing description, this is to be taken to mean 'and/or'.

The invention claimed is:

1. A single acting actuator for an aircraft landing gear assembly, the actuator comprising:
   a housing;
   a cavity provided in the housing;
   a piston and a piston rod connected to the piston;
   the piston being mounted in the cavity for relative movement with respect to the housing such that the piston and piston rod are movable relative to the housing between a retracted position and an extended position;
   the piston dividing the cavity into first and second pressure chambers such that the volume of one of the pressure chambers is increased and the volume of the other is decreased as the piston is moved relative to the housing;
   the piston being movable relative to the housing from one of the retracted and extended positions to the other by a resultant force on the piston due to the pressure of actuator fluid in the first and second pressure chambers;
   wherein at least one of the pressure chambers is associated with first and second outlets, with the actuator being arranged such that, in respect of the relative movement in which the pressure chamber is the decreasing volume pressure chamber,
   in a first stage of the relative movement the first and second outlets are open thereby allowing actuator fluid to flow out of the pressure chamber through the first and second outlets the flow through the second outlet being restricted relative to the flow through the first outlet,
   and in a second stage of the relative movement the second outlet is open but the first outlet is closed, thereby acting to slow the relative movement of the piston with respect to the housing.

2. An actuator according to claim 1 wherein the first and second pressure chambers are connected such that actuator fluid flows from the decreasing volume pressure chamber to the increasing volume pressure chamber.

3. An actuator according to claim 1 wherein both the first and second pressure chambers are associated with respective said first and second outlets.

4. An actuator according to claim 1 wherein the first and/or second outlets associated with the, or each, pressure chamber is also an inlet for actuator fluid.

5. An actuator according to claim 1 wherein, in respect of the or each pressure chamber, the first and second outlets are provided in the housing, with the second outlet positioned outboard of the first outlet such that in the second stage of relative movement the piston closes the first outlet but not the second outlet.

6. An actuator according to claim 5, wherein the actuator comprises an external connection that connects the first and/or second outlets associated with the second pressure chamber to the first and/or second outlets associated with the first pressure chamber.

7. An actuator according to claim 1 wherein, in respect of the or each pressure chamber, one of the first or second outlets is provided in the piston rod and the other is provided in the piston such that during the second stage of relative movement the first outlet is closed by a part of the actuator.

8. An actuator according to claim 7, wherein both the first and second pressure chambers are associated with respective said first and second outlets, the outlets in the piston rod are connected by a first flow path and the outlets in the piston are connected by a second flow path such that there is a connection between the first and second pressure chambers that comprises the first and second flow paths.

9. An actuator according to claim 1, wherein there is a connection, comprising an internal flow path, between the first and second pressure chambers.

10. An actuator according to claim 9 wherein the connection passes across the piston.

11. An actuator according to claim 9, wherein the connection passes through the piston and/or piston rod.

12. An actuator according to claim 1, wherein the rear side of the piston, in relation to the direction of movement of the piston relative to the housing due to the pressure of actuator fluid in the first and second pressure chambers, has a greater exposed cross-sectional area than the front side of the piston.

13. An aircraft landing gear system comprising:
    an aircraft landing gear assembly; and
    an actuation system comprising the actuator according to claim 1; an actuator fluid reservoir; and a pump; arranged such that the pump is operable to pump actuator fluid from the reservoir to the actuator so as to pressurise actuator fluid in at least one of the first and second pressure chambers so as to move the piston relative to the housing from the one of the retracted and extended positions to the other;
    wherein the actuator is arranged such that the movement of the piston relative to the housing from the one of the retracted and extended positions to the other, by a resultant force on the piston due to the pressure of actuator fluid in the first and second pressure chambers, actuates the landing gear assembly from a first configuration to a second configuration;
    the landing gear assembly is movable from the second configuration to the first configuration under the action of a force on the landing gear assembly;
    and the actuator is arranged such that the movement of the landing gear assembly from the second configuration to the first configuration, under the action of said force, acts to move the piston relative to the housing from the other of the retracted and extended positions to said one of the retracted and extended positions.

14. An aircraft landing gear system according to claim 13 wherein the force on the landing gear assembly comprises the weight of at least one component of the landing gear assembly and/or aerodynamic force on the landing gear assembly.

15. An aircraft landing gear system according to claim 13 wherein the landing gear assembly comprises landing gear and/or a landing gear door.

16. An aircraft landing gear system according to claim 13, wherein:
    the actuator is a first actuator and the actuation system comprises a second actuator;
    the landing gear system comprises a lock that is movable between a locked configuration and an unlocked configuration so as to lock and unlock the landing gear assembly in the second configuration;
    and the second actuator is arranged to actuate the lock between its locked configuration and its unlocked configuration.

17. An aircraft comprising an aircraft landing gear system according to claim 13.

18. A method of actuation of an aircraft landing gear assembly using a single acting actuator according to claim 1, wherein the method comprises:
    a) moving the piston relative to the housing from the one of the retracted and extended positions to the other, under the action of a resultant force on the piston due to the pressure of actuator fluid in the first and second pressure chambers, so as to move the landing gear assembly from a first configuration to a second configuration; and b) moving the landing gear assembly from the second configuration to the first configuration under the action of a force on the landing gear assembly, thereby acting to move the piston relative to the housing from the other of the retracted and extended positions to said one of the retracted and extended positions.

19. A single acting actuator for an aircraft landing gear assembly, comprising:
a housing;
a cavity provided in the housing;
a piston and a piston rod connected to the piston;
the piston being mounted in the cavity for relative movement with respect to the housing such that the piston and piston rod are movable relative to the housing between a retracted position and an extended position;
the piston dividing the cavity into first and second pressure chambers such that the volume of one of the pressure chambers is increased and the volume of the other is decreased as the piston is moved relative to the housing;
the piston being movable relative to the housing from one of the retracted and extended positions to the other by a resultant force on the piston due to the pressure of actuator fluid in the first and second pressure chambers;
wherein at least one of the pressure chambers is associated with first and second outlets, with the actuator being arranged such that, in respect of the relative movement in which the pressure chamber is the decreasing volume pressure chamber, in a first stage of the relative movement the first and second outlets are open thereby allowing actuator fluid to flow out of the pressure chamber through the first and second outlets and in a second stage of the relative movement the second outlet is open but the first outlet is closed, thereby acting to slow the relative movement of the piston with respect to the housing, and
wherein the actuator is sealed with respect to the atmosphere.

20. A single acting actuator for an aircraft landing gear assembly, the actuator comprising:
a housing;
a cavity provided in the housing;
a piston and a piston rod connected to the piston;
the piston being mounted in the cavity for relative movement with respect to the housing such that the piston and piston rod are movable relative to the housing between a retracted position and an extended position;
the piston dividing the cavity into first and second pressure chambers such that the volume of one of the pressure chambers is increased and the volume of the other is decreased as the piston is moved relative to the housing;
the piston being movable relative to the housing from one of the retracted and extended positions to the other by a resultant force on the piston due to the pressure of actuator fluid in the first and second pressure chambers; and
a connection which connects the first and second pressure chambers such that actuator fluid flows from the decreasing volume pressure chamber to the increasing volume pressure chamber;
the actuator being arranged such that in respect of the relative movement in which the first and/or second pressure chambers is the decreasing volume pressure chamber, in a second stage of the relative movement the flow of actuator fluid out of the pressure chamber is restricted, relative to a first stage of the relative movement, thereby acting to slow the relative movement.

21. An actuation system for an aircraft landing gear assembly, the actuation system comprising:
a single acting actuator comprising a housing, a cavity provided in the housing, and a piston and piston rod connected to the piston;
a closed system of actuator fluid including an actuator fluid reservoir;
and a pump;
wherein
the piston is mounted in the cavity for relative movement with respect to the housing such that the piston and piston rod are movable relative to the housing between a retracted position and an extended position;
the piston divides the cavity into first and second pressure chambers such that the volume of one of the pressure chambers is increased and the volume of the other is decreased as the piston is moved relative to the housing;
the actuation system is arranged such that the pump is operable to pump actuator fluid from the reservoir to the actuator so as to pressurise actuator fluid in at least one of the first and second pressure chambers so as to move the piston relative to the housing from the one of the retracted and extended positions to the other; and
at least one of the pressure chambers is associated with first and second outlets, with the actuator being arranged such that, in respect of the relative movement in which the pressure chamber is the decreasing volume pressure chamber, in a first stage of the relative movement the first and second outlets are open thereby allowing actuator fluid to flow out of the pressure chamber through the first and second outlets and in a second stage of the relative movement the second outlet is open but the first outlet is closed, thereby acting to slow the relative movement of the piston with respect to the housing.

22. An actuation system according to claim 21, wherein the actuator is connected to a single inlet line, for supplying pressurised actuator fluid to at least one of the first and second pressure chambers.

23. An actuation system for an aircraft landing gear assembly, the actuation system comprising:
a single acting actuator for an aircraft landing gear assembly, the actuator comprising: a housing; a cavity provided in the housing; a piston and a piston rod connected to the piston;
an actuator fluid reservoir; and
a pump;
wherein
the piston is mounted in the cavity for relative movement with respect to the housing such that the piston and piston rod are movable relative to the housing between a retracted position and an extended position;
the piston divides the cavity into first and second pressure chambers such that the volume of one of the pressure chambers is increased and the volume of the other is decreased as the piston is moved relative to the housing;

the piston is movable relative to the housing from one of the retracted and extended positions to the other by a resultant force on the piston due to the pressure of actuator fluid in the first and second pressure chambers, at least one of the pressures chambers is associated with first and second outlets, with the actuator being arranged such that, in respect of the relative movement in which the pressure chamber is the decreasing volume pressures chamber, in a first stage of the relative movement the first and second outlets are open thereby allowing actuator fluid to flow out of the pressure chamber through the first and second outlets and in a second stage of the relative movement the second outlet is open but the first outlet is closed, thereby acting to slow the relative movement of the piston with respect to the housing;

the actuation system is arranged such that the pump is operable to pump actuator fluid from the reservoir to the actuator so as to pressurise actuator fluid in at least one of the first and second pressure chambers so as to move the piston relative to the housing from the one of the retracted and extended positions to the other; and the actuation system comprises an emergency return line that connects the actuator to the actuator fluid reservoir, for passing actuator fluid from the actuator to the fluid reservoir, and a emergency return line flow control that is selectively controllable between an open configuration in which it allows actuator fluid to pass from the actuator to the actuator fluid reservoir and a closed configuration in which it prevents said return flow.

24. An actuation system according to claim 23 wherein:

the actuator is a first actuator and the actuation system comprises a second actuator;

the second actuator comprising:
  a housing;
  a cavity provided in the housing;
  a piston and a piston rod connected to the piston;
  the piston being mounted in the cavity for relative movement with respect to the housing such that the piston and piston rod are movable relative to the housing between a retracted position and an extended position;
  the piston dividing the cavity into first and second pressure chambers such that the volume of one of the pressure chambers is increased and the volume of the other is decreased as the piston is moved relative to the housing;
  the piston being movable relative to the housing from one of the retracted and extended positions to the other by a resultant force on the piston due to the pressure of actuator fluid in the first and second pressure chambers;

wherein the second actuator, pump and actuator fluid reservoir are connected such that the pump is operable to pump actuator fluid from the reservoir to the second actuator so as to pressurise actuator fluid in at least one of the first and second pressure chambers so as to move the piston relative to the housing from the one of the retracted and extended positions to the other.

25. An actuation system according to claim 24 wherein each of the first and second actuators is connected to a respective single inlet line, for supplying pressurised actuator fluid to at least one of the first and second pressure chambers of the actuator.

26. An actuation system according to claim 24, wherein the actuation system comprises a flow control arrangement configured such that the actuation system is controllable between a first configuration in which the piston of one of the actuators is in its extended position and the piston of the other of the actuators is in its retracted position and a second configuration in which the piston of the one of the actuators is in its retracted position and the piston of the other of the actuators is in its extended position.

* * * * *